United States Patent
Beaston et al.

(10) Patent No.: US 10,040,363 B2
(45) Date of Patent: Aug. 7, 2018

(54) BATTERY-ASSISTED ELECTRIC VEHICLE CHARGING SYSTEM AND METHOD

(71) Applicant: Powin Energy Corporation, Tualatin, OR (US)

(72) Inventors: Virgil Lee Beaston, Tualatin, OR (US); Daniel Dee Williams, Ridgefield, WA (US); Patten Atwood Emmons, King City, OR (US)

(73) Assignee: Powin Energy Corporation, Tualatin, OR (US)

( * ) Notice: Subject to any disclaimer, the term of this patent is extended or adjusted under 35 U.S.C. 154(b) by 163 days.

(21) Appl. No.: 14/884,463

(22) Filed: Oct. 15, 2015

(65) Prior Publication Data

US 2017/0106764 A1 Apr. 20, 2017

(51) Int. Cl.
*H02J 7/00* (2006.01)
*B60L 11/18* (2006.01)

(52) U.S. Cl.
CPC ....... *B60L 11/1838* (2013.01); *B60L 11/1861* (2013.01); *B60L 11/1864* (2013.01); *H02J 7/0021* (2013.01); *H02J 7/0027* (2013.01); *B60L 11/1816* (2013.01); *B60L 2230/30* (2013.01)

(58) Field of Classification Search
CPC .............. B60L 11/1861; B60L 11/1864; B60L 11/1838
USPC .................................................. 320/109, 103
See application file for complete search history.

(56) References Cited

U.S. PATENT DOCUMENTS

| | | | |
|---|---|---|---|
| 5,952,815 | A | 9/1999 | Rouillard et al. |
| 6,172,481 | B1 | 1/2001 | Curtiss |
| 7,497,285 | B1 | 3/2009 | Radev |
| 7,583,053 | B2 | 9/2009 | Kamohara |
| 8,111,035 | B2 | 2/2012 | Rosenstock |
| 9,168,836 | B2 | 10/2015 | Jacobsen |
| 9,331,497 | B2 | 5/2016 | Beaston |
| 9,647,463 | B2 | 5/2017 | Brandl et al. |
| 2004/0130292 | A1* | 7/2004 | Buchanan ........... B60L 11/1811 320/116 |

(Continued)

FOREIGN PATENT DOCUMENTS

| | | |
|---|---|---|
| CN | 1367565 A | 9/2002 |
| CN | 2648617 Y | 10/2004 |

(Continued)

OTHER PUBLICATIONS

Non-Final Office Action dated May 12, 2015, in U.S. Appl. No. 13/978,689, filed Aug. 27, 2013; 12 pages.

(Continued)

*Primary Examiner* — Drew A Dunn
*Assistant Examiner* — Zixuan Zhou
(74) *Attorney, Agent, or Firm* — Sterne, Kessler, Goldstein & Fox P.L.L.C.

(57) ABSTRACT

The disclosed systems and methods are directed to a battery assisted charging station. A battery system comprising plurality of batteries and a battery management system software controlling the operations of the battery system, function together with a vehicle charging system that charges electric vehicles using one or both of stored power provided by a battery system, and power provided by a utility power grid. The battery system uses the power grid to charge the batteries therein.

18 Claims, 21 Drawing Sheets

(56) References Cited

U.S. PATENT DOCUMENTS

| | | |
|---|---|---|
| 2004/0189248 A1 | 9/2004 | Boskovitch et al. |
| 2005/0024016 A1 | 2/2005 | Breen et al. |
| 2005/0230976 A1 | 10/2005 | Yang |
| 2006/0116797 A1 | 6/2006 | Moran |
| 2007/0124037 A1 | 5/2007 | Moran |
| 2007/0191180 A1 | 8/2007 | Yang |
| 2008/0093851 A1 | 4/2008 | Maeda et al. |
| 2008/0238356 A1* | 10/2008 | Batson ............... H02J 7/0045 320/103 |
| 2008/0309288 A1 | 12/2008 | Benckenstein et al. |
| 2009/0222158 A1 | 9/2009 | Kubota et al. |
| 2009/0243540 A1 | 10/2009 | Choi et al. |
| 2010/0145562 A1 | 6/2010 | Moran |
| 2010/0237829 A1 | 9/2010 | Tatebayashi et al. |
| 2010/0248008 A1 | 9/2010 | Sugawara et al. |
| 2011/0014501 A1 | 1/2011 | Scheucher |
| 2011/0133920 A1 | 6/2011 | Meadors |
| 2011/0137502 A1 | 6/2011 | Kato et al. |
| 2011/0231049 A1 | 9/2011 | Le Brusq et al. |
| 2011/0244283 A1 | 10/2011 | Seto et al. |
| 2011/0313613 A1 | 12/2011 | Kawahara et al. |
| 2012/0062187 A1 | 3/2012 | Shim |
| 2012/0068715 A1 | 3/2012 | Martaeng |
| 2012/0074911 A1 | 3/2012 | Murao |
| 2012/0105001 A1 | 5/2012 | Gallegos et al. |
| 2012/0303225 A1 | 11/2012 | Futahashi et al. |
| 2013/0002197 A1* | 1/2013 | Hernandez ......... B60L 11/1824 320/109 |
| 2013/0328530 A1 | 12/2013 | Beaston |
| 2013/0337299 A1 | 12/2013 | Sugawara |
| 2014/0015469 A1 | 1/2014 | Beaston et al. |
| 2014/0015488 A1 | 1/2014 | Despesse |
| 2014/0079963 A1 | 3/2014 | Takeuchi |
| 2014/0220396 A1 | 8/2014 | Lee et al. |
| 2015/0202973 A1* | 7/2015 | Chang ............... B60L 11/1844 320/101 |
| 2015/0349569 A1 | 12/2015 | Christensen et al. |
| 2016/0111900 A1 | 4/2016 | Beaston et al. |
| 2016/0141894 A1 | 5/2016 | Beaston |
| 2017/0038433 A1 | 2/2017 | Beaston et al. |
| 2017/0040646 A1 | 2/2017 | Beaston |
| 2017/0077558 A1 | 3/2017 | Nystrom et al. |
| 2017/0077559 A1 | 3/2017 | Beaston |
| 2017/0126032 A1 | 5/2017 | Beaston et al. |

FOREIGN PATENT DOCUMENTS

| | | |
|---|---|---|
| CN | 2796215 Y | 7/2006 |
| CN | 1819395 A | 8/2006 |
| CN | 1011992755 A | 6/2008 |
| CN | 101222150 A | 7/2008 |
| CN | 102570568 A | 7/2012 |
| CN | 102882263 A | 1/2013 |
| CN | 202663154 U | 1/2013 |
| CN | 103253143 A | 8/2013 |
| JP | 2011097803 A | 5/2011 |
| KR | 20110107265 A | 9/2011 |
| KR | 101287586 B1 | 7/2013 |
| KR | 20130071923 A | 7/2013 |
| WO | WO 2011/078388 | 6/2011 |
| WO | WO 2012/110497 A1 | 8/2012 |

OTHER PUBLICATIONS

Final Office Action dated Sep. 21, 2015, in U.S. Appl. No. 13/978,689, filed Aug. 27, 2013; 12 pages.
Non-Final Office Action dated Nov. 23, 2015, in U.S. Appl. No. 13/978,689, filed Aug. 27, 2013; 11 pages.
Notice of Allowance dated Mar. 21, 2016, in U.S. Appl. No. 13/978,689, filed Aug. 27, 2013; 8 pages.
International Preliminary Report on Patentability, dated Sep. 10, 2013, in International Patent Application No. PCT/CN2011/071548; 5 pages.
International Search Report and Written Opinion on Patentability, dated Dec. 1, 2011, in International Patent Application No. PCT/CN2011/071548; 10 pages.
U.S. Appl. No. 14/678,074, "Electrical Energy Storage Unit and Control System and Applications Thereof," to Beaston, et al., filed Apr. 3, 2015.
U.S. Appl. No. 14/851,460, "Battery Management System (BMS) Having Isolated, Distributed, Daisy-Chained Battery Module Controllers," to Nystrom, et al., filed Sep. 11, 2015.
U.S. Appl. No. 14/851,482, "Battery Pack with Integrated Battery Management System," to Beaston, et al., filed Sep. 11, 2015.
U.S. Appl. No. 14/932,688, "Battery Energy Storage System," to Beaston, filed Nov. 4, 2015.
U.S. Appl. No. 14/962,491, "Battery Energy Storage System and Control System and Applications Thereof," to Beaston, filed Dec. 8, 2015.
U.S. Appl. No. 14/819,779, "Warranty Tracker for a Battery Pack," to Beaston, filed Aug. 6, 2015.
U.S. Appl. No. 14/819,774, "Systems and Methods for Detecting a Battery Pack Having an Operating Issue or Defect," to Beaston, filed Aug. 6, 2015.
English language abstract of JP 2011097803 A, espacenet database, Worldwide, published May 12, 2012.
English language abstract of KR 101287586 B1, espacenet database, Worldwide, published Jul. 19, 2013.
English language abstract of KR 20110107265 A, espacenet database, Worldwide, published Sep. 30, 2011.
English language abstract of KR 20130071923 A, espacenet database, Worldwide, published Jul. 1, 2013.
International Search Report and Written Opinion for International Patent Application No. PCT/US2014/072606, Korean Intellectual Property Office, Republic of Korea, dated Apr. 20, 2015, 13 pages.
U.S. Appl. No. 15/389,188, "Battery Pack Monitoring and Warranty System," to Beaston et al., filed Dec. 22, 2016.
U.S. Appl. No. 15/604,329, "World-Wide Web of Networked, Smart, Scalable, Plug & Play Battery Packs Having a Battery Pack Operating System, and Applications Thereof," to Beaston, filed May 24, 2017.
https://www.merriam-webster.com/dictionary/daisy%20chain.
Chris Bakken and Ives Meadors, applicants; U.S. Appl. No. 61/313,548; publicly available as of Jun. 9, 2011 (filed Mar. 12, 2010); 14 pages including filing receipt, provisional cover sheet, and EFS receipt.
English language abstract of Chinese Patent Publication No. CN 101222150 A, published Jul. 16, 2008, 1 page, retrieved from https://worldwide.espacenet.com.
English language abstract of Chinese Patent Publication No. CN 102570568 A, published Jul. 11, 2012, 1 page, retrieved from https://worldwide.espacenet.com.
English language abstract of Chinese Patent Publication No. CN 102882263 A, published Jan. 16, 2013, 1 page, retrieved from https://worldwide.espacenet.com.
English language abstract of Chinese Patent Publication No. CN 103253143 A, published Aug. 21, 2013, 1 page, retrieved from https://worldwide.espacenet.com.
English language abstract of Chinese Patent Publication No. CN 202663154 U, published Jan. 9, 2013, 1 page, retrieved from https://worldwide.espacenet.com.

* cited by examiner

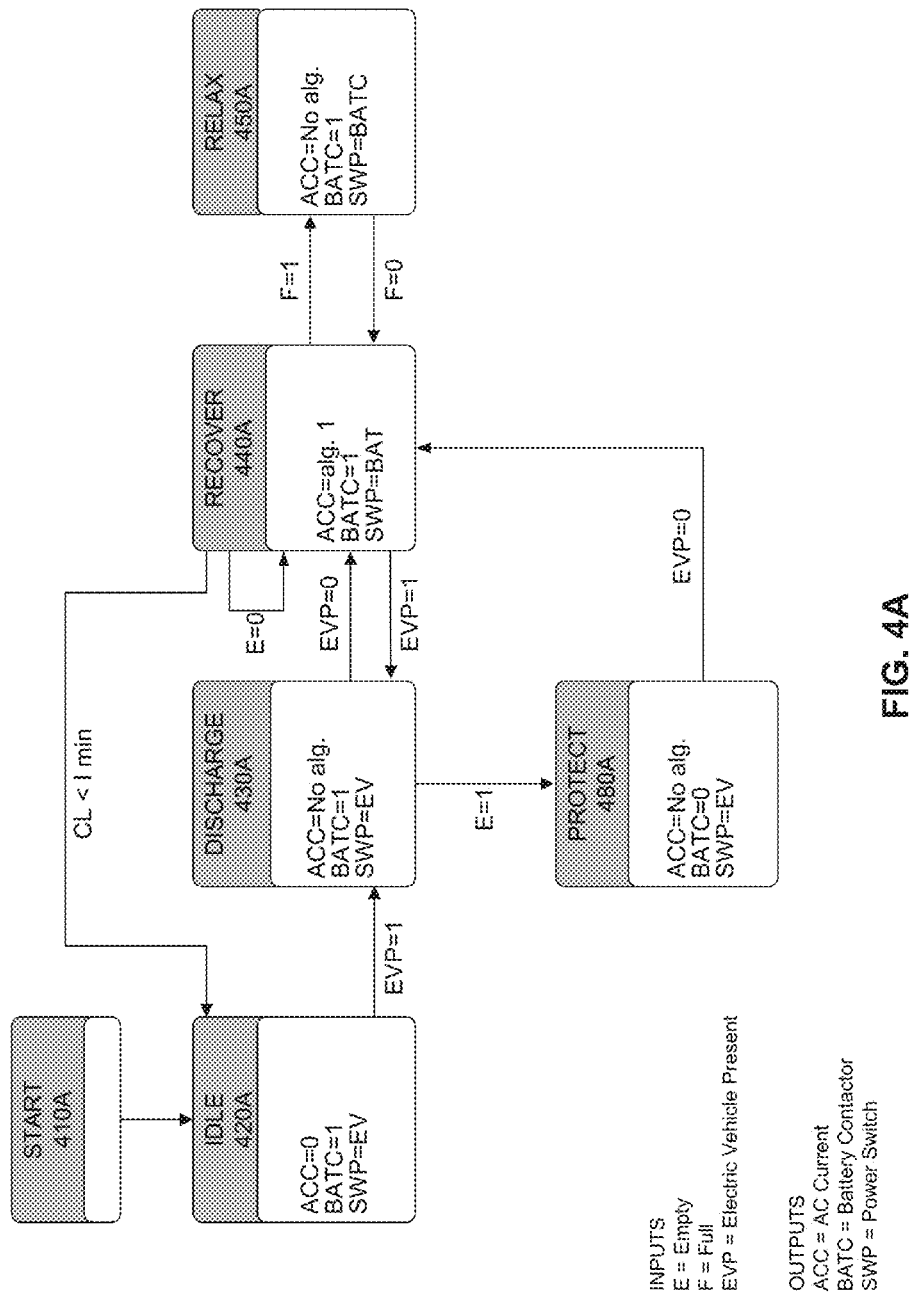

BATTERY-ASSISTED ELECTRIC VEHICLE CHARGING SYSTEM AND METHOD

BACKGROUND

Field

Embodiments disclosed herein are directed to a battery-assisted electric vehicle charging system and method that can be used to charge an electric vehicle.

Background

As the adverse effects of greenhouse gasses produced by burning fossil fuels become more apparent—e.g., pollution, global warming, etc.—there is growing demand to replace fuel burning vehicles by electric vehicles. Recently, vehicle manufactures are producing and selling electric vehicles. As a result, electric vehicle charging stations are needed to provide energy to the electric vehicles.

BRIEF SUMMARY

Embodiments disclosed herein are directed to a battery-assisted electric vehicle charging system and method that can be used to charge an electric vehicle. Some disclosed embodiments describe a battery-assisted electric vehicle charging station ("charging station") that can provide energy to an electric vehicle from the power grid, or from a combination of the power grid and a battery energy storage system (BESS). The charging station may be coupled to the power grid and may include or otherwise be coupled to the BESS.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

FIGS. 4A-4C illustrate example state machines of battery-assisted electric vehicle charging stations according to embodiments of the disclosure.

In the drawings, like reference numbers may indicate identical or functionally similar elements.

DETAILED DESCRIPTION

Figure 1A:
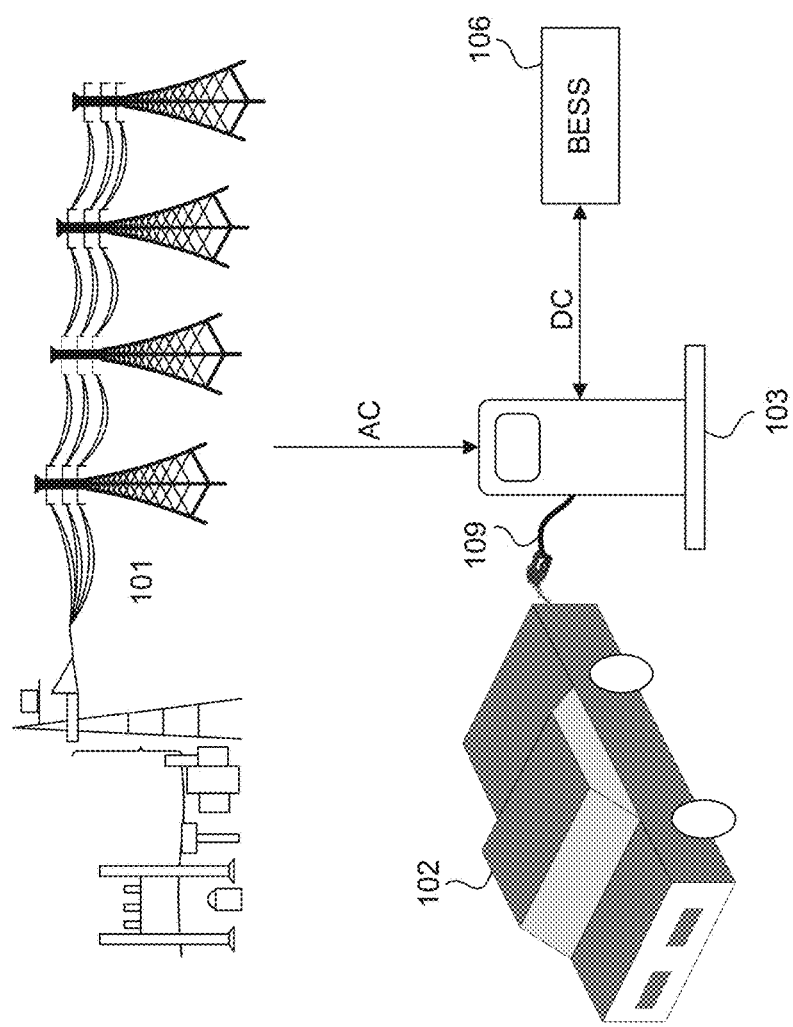
FIGS. 1A-1C are diagrams illustrating example embodiments of battery-assisted electric vehicle charging systems.

While the present disclosure is described herein with illustrative embodiments for particular applications, it should be understood that the disclosure is not limited thereto. A person skilled in the art with access to the teachings provided herein will recognize additional modifications, applications, and embodiments within the scope thereof and additional fields in which the disclosure would be of significant utility.

The terms "embodiments" or "example embodiments" do not require that all embodiments include the discussed feature, advantage, or mode of operation. Alternate embodiments may be devised without departing from the scope or spirit of the disclosure, and well-known elements may not be described in detail or may be omitted so as not to obscure the relevant details. In addition, the terminology used herein is for the purpose of describing particular embodiments only and is not intended to be limiting. For example, as used herein, the singular forms "a," "an" and "the" are intended to include the plural forms as well, unless the context clearly indicates otherwise. It will be further understood that the terms "comprises," "comprising," "includes" and "including," when used herein, specify the presence of stated features, integers, steps, operations, elements, and components, but do not preclude the presence or addition of one or more other features, integers, steps, operations, elements, components, or groups thereof.

Embodiments disclosed herein are directed to a battery-assisted electric vehicle charging system and method that can be used to charge an electric vehicle. Some disclosed embodiments describe a battery-assisted electric vehicle charging station ("charging station") that can provide energy to an electric vehicle from the power grid, or from a combination of the power grid and a battery energy storage system. The charging station may be coupled to the power grid and may include or otherwise be coupled to the battery energy storage system.

In some situations, the charging station may provide energy to an electric vehicle from both the power grid and the battery energy storage system. This may be referred to as "fast" or "quick" charging. In other situations, the charging station may provide energy to an electric vehicle from the power grid, but not the battery energy storage system. This may be referred to as "slow" charging. Fast charging may provide more power to an electric vehicle being charged, and thus may charge the electric vehicle in a shorter amount of time than slow charging. The charging station may operate in a slow charging mode when the battery energy storage system cannot provide energy. For example, the battery energy storage system may stop providing energy when the batteries within the battery energy storage system discharge below a certain level. In some embodiments, the power grid can simultaneously provide energy to an electric vehicle via the charging station as well as the battery energy storage system (e.g., to charge the batteries therein).

In one embodiment, a battery-assisted electric vehicle charging station can provide up to 50 kilowatts (kW) of power to an electric vehicle, such as 20 kW from the power grid and 30 kW from a battery energy storage system. In this embodiment, the charging station can provide 20 kW from the power grid when operating in slow charging mode, and can provide more than 20 kW (e.g., 50 kW) from a combination of the power grid and the battery energy storage system in fast charging mode. As should be apparent to one of ordinary skill in the art, the charging station may be configured to provide more or less power than 50 kW, and may be configured to provide more power from the power grid than the battery energy storage system, or vice versa. These and other features of a battery-assisted electric vehicle charging system are discussed in more detail below.

Figure 1B:
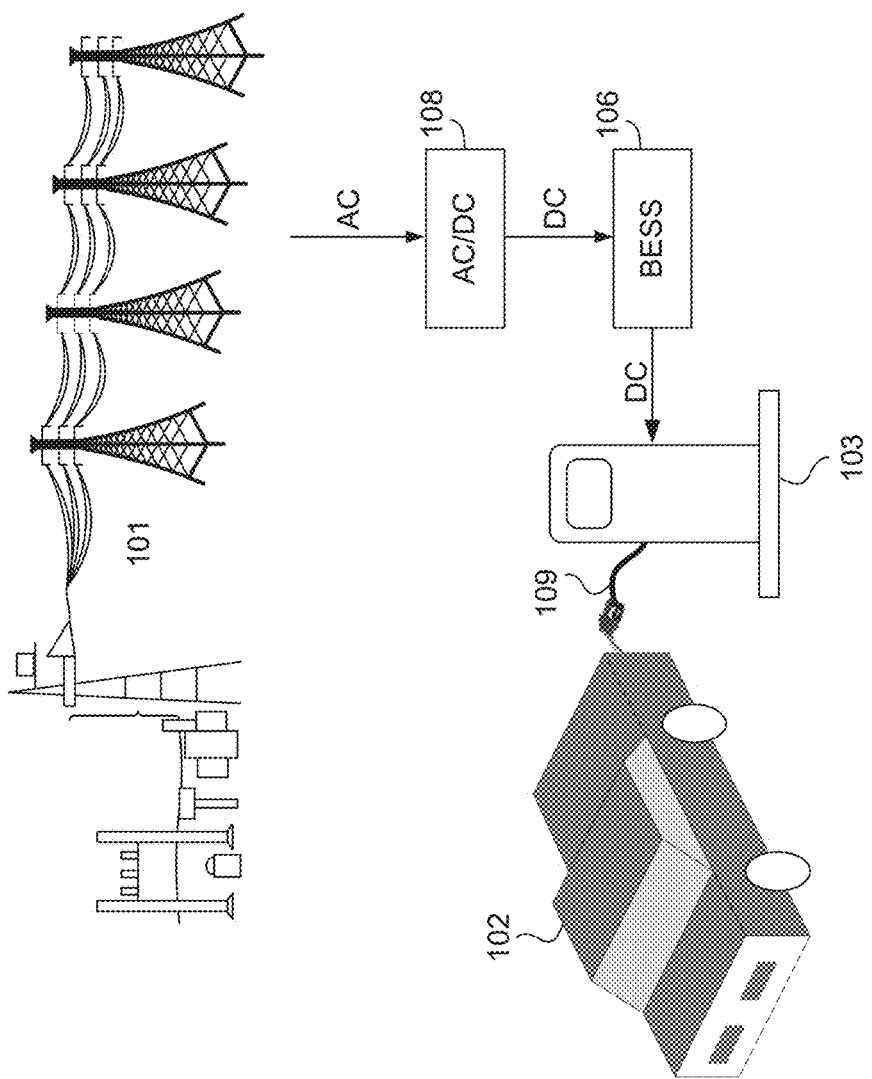
Figure 1C:
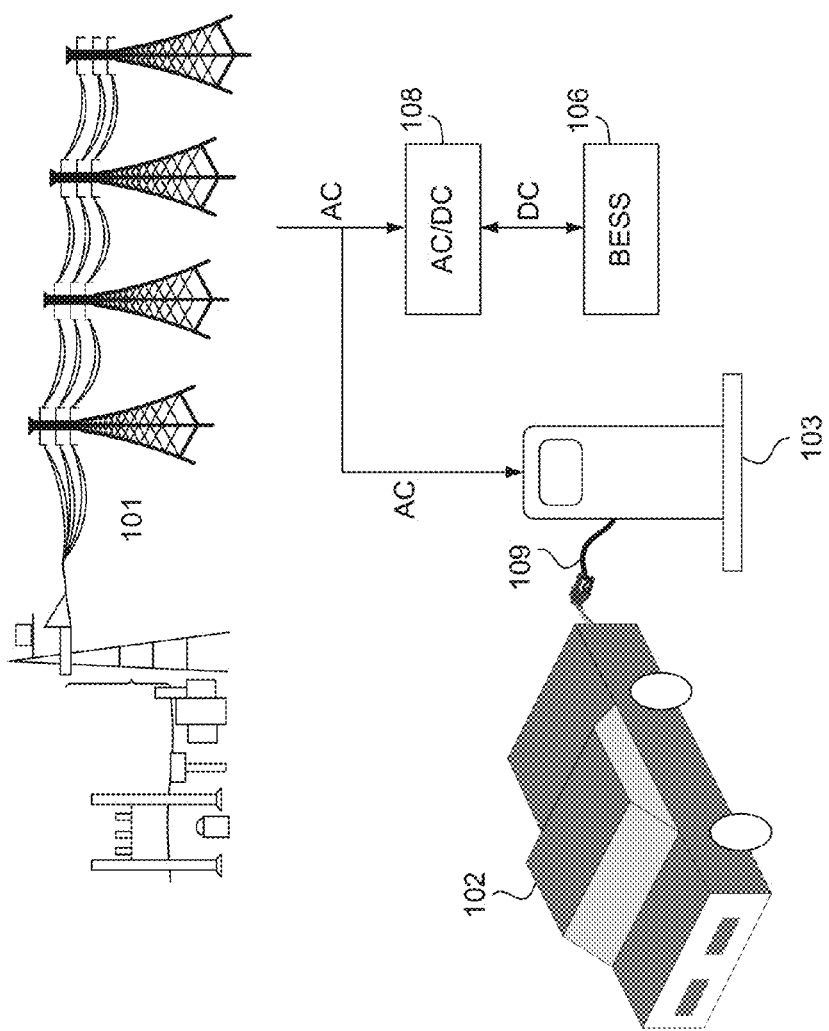

Turning to FIGS. 1A-1C, example battery-assisted electric vehicle charging systems 100A-100C are illustrated according to embodiments of the disclosure. The systems 100A-100C include power grid 101, battery energy storage system (BESS) 106, and charging station 103. In some embodiments, BESS 106 may be disposed within the enclosure of charging station 103. Charging station 103 may provide energy to electric vehicle 102. In FIGS. 1A-1C, the charging station 103 is equipped with a standard charging interface 109 compatible with the charging system of electric vehicle 102.

Turning to FIG. 1A, an example battery-assisted electric vehicle charging system 100A is illustrated. In this example battery-assisted electric vehicle charging system, two sources of energy and/or power are connected to the charging station 103: (1) alternating current (AC) power from the power grid 101, and (2) direct current (DC) power from the BESS 106. The AC power from the power grid 101 is converted to DC power by one or more power converters in the charging station 103. The charging station 103 provides DC power to the electric vehicle 102. In the embodiment of FIG. 1A, in the event that BESS 106 is not able to provide energy to electric vehicle 102 (e.g., because the batteries in BESS 106 have discharged below a predetermined threshold), electric vehicle 102 may still receive energy from power grid 101. In this embodiment, charging station 103 is used to charge the batteries of BESS 106 similar to how it charges the batteries of electric vehicle 102.

Turning to FIG. 1B, another example battery-assisted electric vehicle charging system 100B is illustrated. In this example battery-assisted electric vehicle charging system, BESS 106 provides energy to the charging station 103, and power grid 101 provides power to BESS 106 via AC/DC converter 108. Thus, unlike the embodiment shown in FIG. 1A, power grid 101 in FIG. 1B is not directly coupled to the charging station 103. Rather, power grid 101 in FIG. 1B indirectly provides energy to charging station 103 via AC/DC converter 108 and BESS 106. BESS 106 is charged from power grid 101 (via AC/DC converter 108).

Turning to FIG. 1C, another example battery-assisted electric vehicle charging system 100C is illustrated. In this embodiment, the system 100C includes bi-directional AC/DC converter 108 that is external to charging station 103. As shown, two sources of energy and/or power are connected to charging station 103: (1) AC power from power grid 101, and (2) AC power via bi-directional AC/DC converter 108 and BESS 106. The AC power from power grid 101 may be converted to DC power by bi-directional AC/DC converter 108 and used to charge the batteries of BESS 106. In this embodiment, in the event that BESS 106 is not able to provide energy to electric vehicle 102 (e.g., because the batteries in BESS 106 have discharged below a predetermined threshold), electric vehicle 102 may still receive energy from power grid 101 in the embodiment of FIG. 1C.

In example embodiments illustrated in FIGS. 1A-1C, BESS 106 includes one or more battery packs. Each battery pack includes one or more batteries. When the batteries within BESS 106 discharge below a certain level (e.g., a voltage level or a charge level), BESS 106 stops providing energy to an electric vehicle until the batteries are recharged. In some embodiments, BESS 106 may be recharged at the same time that electric vehicle 102 is being charged at station 103 using energy provided by power grid 101. That is, power grid 101 may simultaneously charge BESS 106 and electric vehicle 102 in some embodiments. Details of an example battery pack and an example battery pack management system that can be used to implement BESS 106 are described in more detail below.

Figure 2A:
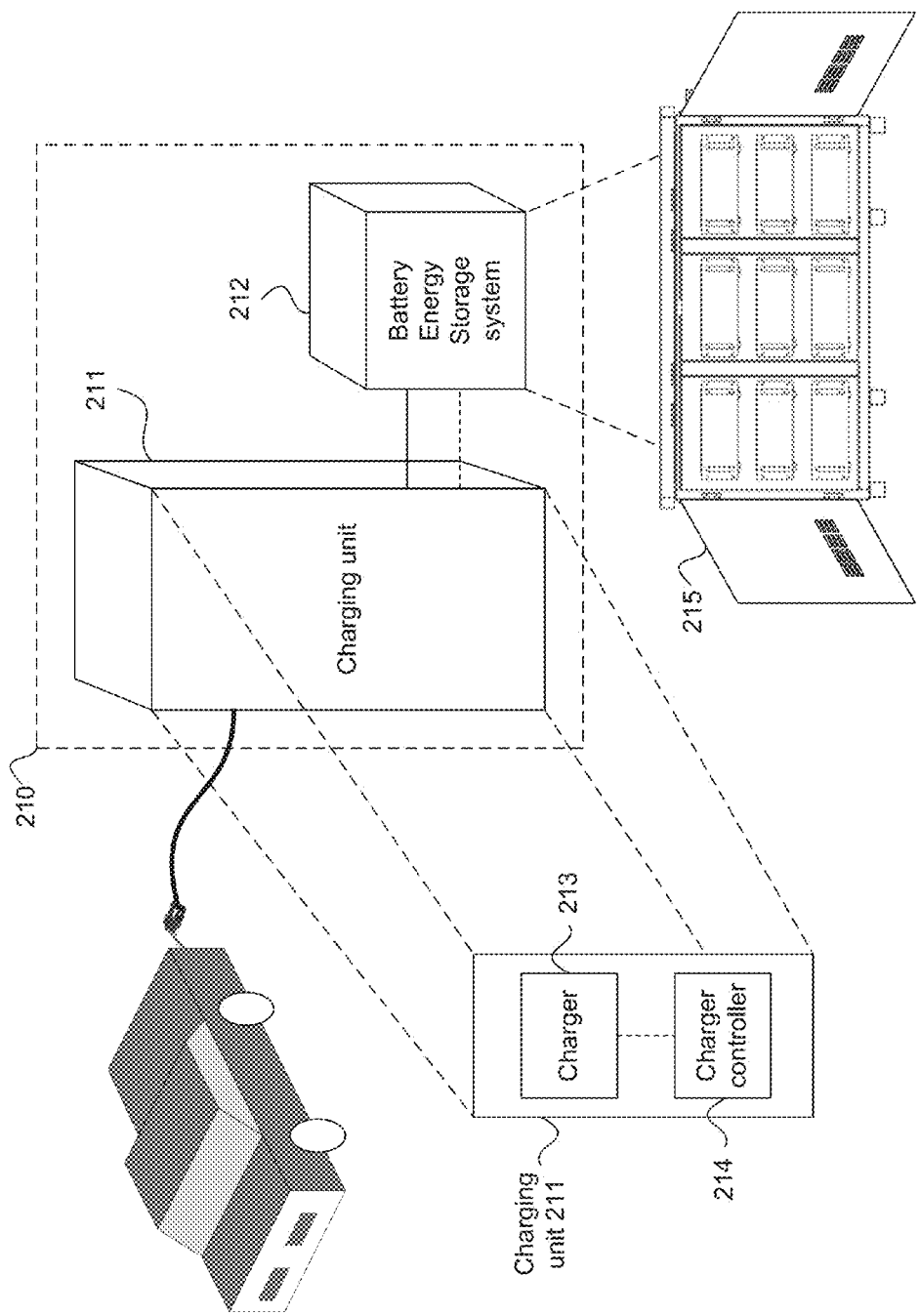
FIGS. 2A-2B are diagrams illustrating example embodiments of battery-assisted electric vehicle charging stations.

FIG. 2A illustrates an example embodiment of a battery-assisted electric vehicle charging station. In this example, battery-assisted electric vehicle charging station 210 comprises two separate units: charging unit 211 and BESS 212. As shown, charging unit 211 and BESS 212 are coupled such that energy can be provided from charging unit 211 to BESS 212 and vice versa (e.g., illustrated by the solid line connecting charging unit 211 and BESS 212 in FIG. 2A). Charging unit 211 and BESS 212 may also be communicatively linked such that communication signals can be sent from charging unit 211 to BESS 212 and vice versa (e.g., illustrated by the dashed line connecting charging unit 211 and BESS 212 in FIG. 2A). In an example embodiment, this communication link may be implemented as a controller area network (CAN) bus, but is not so limited.

Still considering FIG. 2A, charging unit 210 comprises charger 213 and charger controller 214. Charger 213 may comprise one or more AC/DC converters that convert the AC power received from the power grid to DC power. Charger 213 may also comprise one or more DC/DC converters that convert the DC power received from BESS 212 from a first voltage to a second voltage. The specific value of DC voltage required to charge an electric vehicle may be determined by charger controller 214. Charger controller 214 comprises a processing unit that communicates with a processing unit in an electric vehicle. The communication between the processing unit of charger controller 214 and the processing unit residing in the electric vehicle may comprise receiving the state of charge of the batteries within electric vehicle and/or the value of voltage and/or current required for charging the electric vehicle. BESS 212 of FIG. 2A may be implemented as shown by battery box 215. As shown, battery box 215 is a structure for holding arrays of battery packs in a stacked arrangement. One of the stacked packs may be a battery system controller (which may, in some embodiments, be referred to as a string controller). The battery system controller may control certain aspects of BESS 215, such as when the battery packs charge and discharge, as well as monitor operating parameters, such as voltage, temperature, and state-of-charge of the battery packs.

Figure 2B:
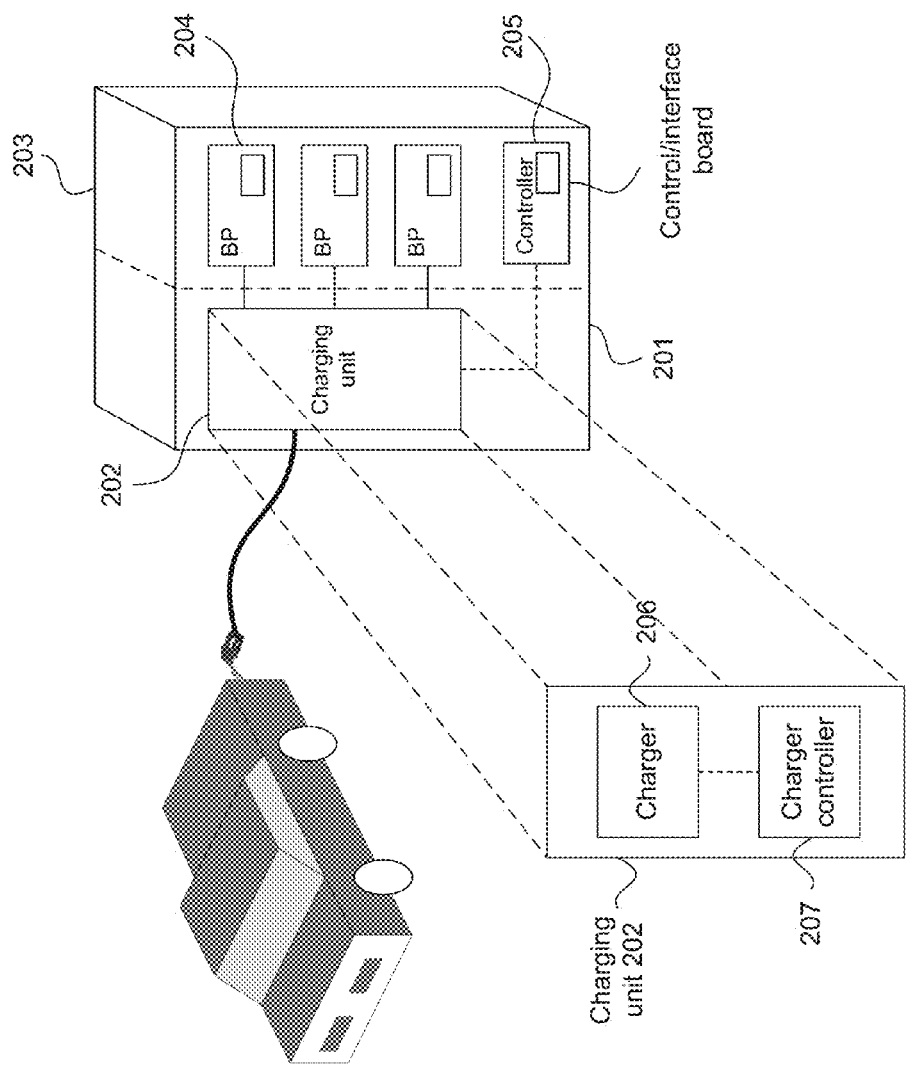

FIG. 2B illustrates another example embodiment of a battery-assisted electric vehicle charging station. In this example, battery-assisted electric vehicle charging station 201 comprises a charging unit 202 and BESS 203 integrated as a single unit. Charging unit 202 and BESS 203 are coupled such that energy can be provided from charging unit 202 to BESS 203 and vice versa (e.g., illustrated by the solid lines connecting charging unit 202 and BESS 203 in FIG. 2B). Furthermore, charging unit 202 and BESS 203 are also communicatively linked, such that communication signals can be sent from charging unit 202 to BESS 203 and vice versa (e.g., illustrated by the dashed line connecting charging unit 202 and BESS 203 in FIG. 2B). In an example embodiment, this communication link may be implemented as a controller area network (CAN) bus, but is not so limited.

In FIG. 2B, charging unit 202 includes charger 206 and charger controller 207. Charger 206 may comprise one or more AC/DC converters that convert the AC power received from the power grid to DC power. Charger 206 may also comprise one or more DC/DC converters that convert the DC power received from BESS 203 from a first voltage to a second voltage. The specific value of DC voltage required to charge an electric vehicle may be determined at charger controller 207. Charger controller 207 comprises a processing unit that communicates with a processing unit in an electric vehicle. The communication between the processing unit of charger controller 207 and the processing unit residing in an electric vehicle may include receiving the state of charge of the batteries within the electric vehicle and/or the value of voltage and/or current required for charging the electric vehicle by the processing unit of charger controller 207.

Still considering FIG. 2B, BESS 203 may comprise one or more battery packs, such as battery pack 204. Each battery pack includes one or more batteries. Furthermore, BESS 203 also includes a control/interface board 205. Control/interface board 205 comprises a battery system controller (which may, in some embodiments, be referred to as a string controller) that manages and controls the operation of battery packs within BESS 203.

Figure 3A:
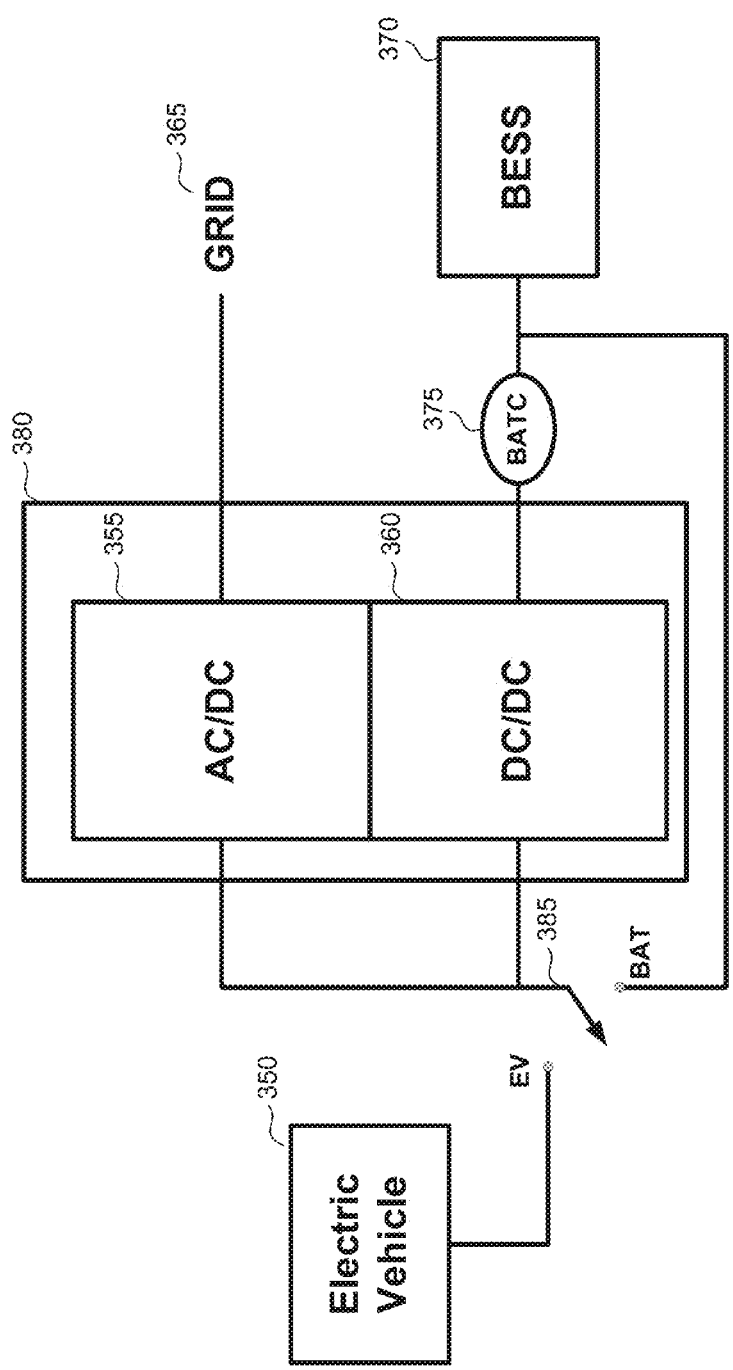
FIG. 3A-3B are diagrams illustrating internal components of example embodiments of battery-assisted electric vehicle charging systems.

FIG. 3A is a diagram illustrating internal components of an example embodiment of a battery-assisted electric vehicle charging system 300A. The example components depicted in FIG. 3A may be used to implement the charging station 210 of FIG. 2A and/or charging station 201 of FIG. 2B. Battery-assisted electric vehicle charging system 300A of FIG. 3A includes BESS 370 and charging unit 380 that includes one or more AC/DC module 355 and one or more DC/DC module 360. In this embodiment, AC/DC module 355 is coupled to power grid 365, and DC/DC module 360 is coupled to BESS 370 via battery contactor 375. As explained with respect to FIGS. 2A and 2B, BESS 370 and charging unit 380 may be integrated within the same physical enclosure or may be implemented as separate physical units that are coupled together via cabling and the like.

Charging system 300A includes power switch 385. In some embodiments, power switch 385 may be a tri-state switch that may be open, connected to EV, or connected to BAT. When connected to EV, power switch 385 completes the connection between charging unit 380 and electric vehicle 350, allowing charging unit 380 to provide energy to electric vehicle 350 to charge its batteries. When connected to BAT, power switch 385 completes the connection between charging unit 380 and BESS 370, allowing AC/DC module 355 to provide energy to BESS 370 and charge its batteries. In some embodiments, BESS 370 implements the same interface and/or protocols as electric vehicle 350 (e.g., CHAdeMO) to couple with charging unit 380. In these embodiments, BESS 370 appears as and is charged in the same manner as an electric vehicle via charging unit 380.

Battery contactor 375 may be opened or closed depending on the state of charging system 300A. For example, battery contactor 375 may be closed to complete the connection between BESS 370 and DC/DC module 360 when BESS batteries are discharging to provide energy to electric vehicle 350. Battery contactor 375 may be open to disconnect BESS 370 and DC/DC module 360 when BESS 370 cannot provide energy to electric vehicle 350 (e.g., BESS batteries are depleted) or when BESS batteries are being charged via power grid 365 (connecting power switch 385 to BAT allows AC/DC module 355 to charge BESS batteries via power grid 365). In other embodiments, a hardware or software enable signal may be used in place of battery contactor 375 to connect and disconnect BESS 370 and DC/DC module 360.

As explained above, charging system 300A may be able to provide energy to electric vehicle 350 in a "fast" or "quick" charging mode by providing energy from both power grid 365 and BESS 370. In this mode, power switch 385 is connected to EV to complete the connection between charging unit 380 and electric vehicle 350, and battery connector 375 is closed to complete the connection between BESS 370 and DC/DC module 360. Thus, AC/DC module 355 can provide energy to electric vehicle 350 via power grid 365 and DC/DC module 360 can provide energy to electric vehicle 350 via BESS 370.

Charging system 300A may also be able to provide energy to electric vehicle in a "slow" charging mode by providing energy from the power grid 365 alone. In this mode, power switch 385 is connected to EV to complete the connection between charging unit 380 and electric vehicle 350, and battery connector 375 is open to disconnect BESS 370 and DC/DC module 360. Thus, AC/DC module 355 can provide energy to electric vehicle 350 via power grid 365, but DC/DC module 360 cannot provide energy to electric vehicle 350 via BESS 370. Charging system 300A may enter "slow" charging mode when the BESS batteries are depleted and cannot safely provide energy to electric vehicle 350.

Figure 3B:
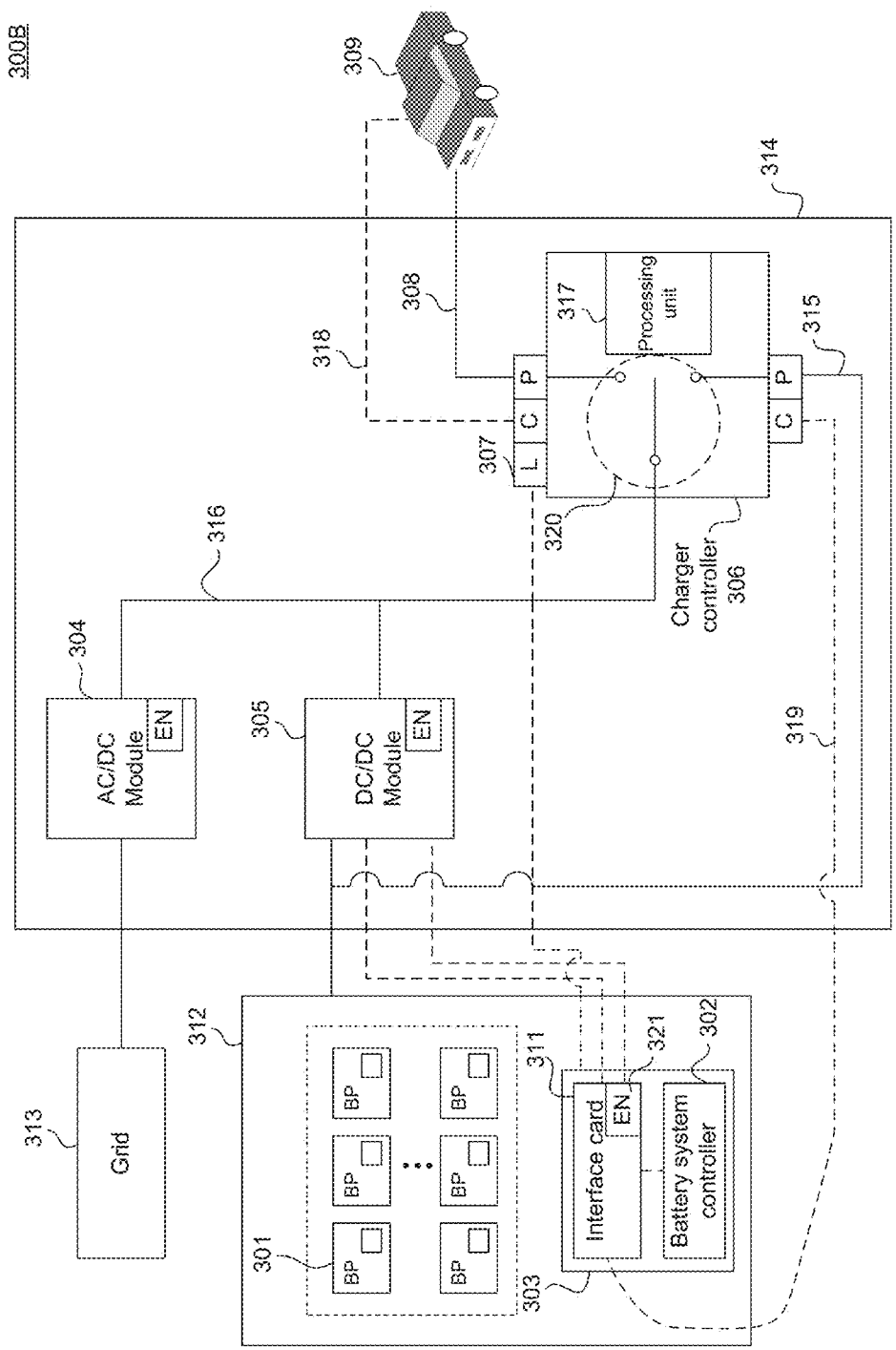

FIG. 3B further illustrates the internal components of an example embodiment of a battery-assisted electric vehicle charging system. The example components depicted in FIG. 3 may be used to implement the charging stations 210 and 201 of FIG. 2A and FIG. 2B, respectively. Battery-assisted electric vehicle charging system 300 of FIG. 3 includes BESS 312 and charging unit 314. As explained with respect to FIGS. 2A and 2B. BESS 312 and charging unit 314 may be integrated within the same physical enclosure or may be implemented as separate physical units that are coupled together via cabling and the like.

BESS 312 includes one or more battery packs 301 and a control/interface board 303. Control/interface board 303 may include a battery system controller 302 and an interface card 311. Interface card 311 may provide a communication interface between battery system controller 302 and charging unit 314. That is, interface card 311 may communicate with the battery system controller 302 via a communication path on control/interface board 303. This communication path is depicted as the dashed line in FIG. 3 that connects interface card 311 with battery system controller 302. Interface card 311 may also be configured to exchange signals with charging unit 314 using wired or wireless communication. In an example embodiment, communication between interface card 311 and charging unit 314 takes place via a CAN bus. In some embodiments, interface card 311 and battery system controller 302 are configured to exchange data via the transmission control protocol (TCP).

Charging and discharging is controlled by operation of AC/DC (304—charges battery) and DC/DC (305—discharges battery) modules. Interface card 311 enables and disables these modules. Battery system controller 302 provides safety for the batteries and it acts like the processor in a car that sends values used to control the charge rate.

In an embodiment, control/interface board 303 also comprises an enable unit 321 disposed on or in interface card 311. Enable unit 321 may be implemented in software or hardware (such as relays). Enable unit 321 may be used by battery system controller 302 to control the amount of power BESS 312 provides to electric vehicle 309.

Additionally, battery system controller 302 may control some of the functions of battery packs based on status signals it receives from one or more battery packs 301. Status signals from battery packs may include (but are not limited to) information regarding the state of charge, temperature, or voltage of the battery packs. As an example, battery system controller 302 may receive a signal related to the voltage of one or more of the battery packs, such as an alert that the voltage of a battery pack is above or below operating thresholds. As another example, the battery system controller 302 may receive a signal related to the temperature of a battery pack, such as an alert that the temperature is above or below operating thresholds. Battery system controller 302 may also receive signals from charging unit 314.

Still considering FIG. 3, charging unit 314 is coupled to both BESS 312 and power grid 313. Charging unit 314 may include one or more AC/DC modules (e.g., AC/DC module 304) and/or one or more DC/DC modules (e.g., DC/DC module 305). A plurality of AC/DC modules may be connected in parallel. Similarly, a plurality of DC/DC modules may be connected in parallel. Each AC/DC module 304 may perform AC to DC power conversion. In FIG. 3, each AC/DC module 304 may receive as input AC power from power grid 313 and output DC power. Each DC/DC module may perform DC to DC power conversion to convert a first DC voltage to a second DC. The output of AC/DC module 304 and of DC/DC module 305 may be enabled or disabled in software or in hardware.

Charging unit 314 of FIG. 3 includes at least two power paths 315 and 316. Power path 316 is used to provide energy from power grid 313 and/or from BESS 312 to electric vehicle 309. Power path 315 is used to provide energy from power grid 313 to BESS 312 (via charge controller 306 and power path 316) in order to charge/recharge the batteries therein. Power paths 315 and 316 may be, e.g., DC rails.

As previously described, control/interface board 303 may comprise an enable unit 321 that may be used by battery system controller 302 to control the amount of power BESS 312 provides to charging unit 314 and thereby to electric vehicle 309. In an example embodiment, enable unit 321 of interface card 311 of FIG. 3 may enable or disable one or more DC/DC modules (e.g., DC/DC module 305), thereby controlling the amount of DC power that is delivered from BESS 312 to electric vehicle 309. For example, enable unit 321 may use software to disable one or more DC/DC modules (e.g., DC/DC module 305). Alternatively, enable unit 321 may control a relay and disconnect the flow of energy from BESS 312 to one or more DC/DC modules (e.g., DC/DC module 305).

Charging unit 314 of FIG. 3 also includes charger controller 306. Charger controller 306 includes a processing unit 317 and a power switching unit 320. Charger controller 306 also includes power interface 308 through which energy may be provided to electric vehicle 309. Power interface 308 may be a standard electric vehicle power interface such as CHAdeMO, but is not limited thereto. In some embodiments power interface 308 may be a proprietary interface.

Charger controller 306 may also control provision of energy from power grid 313 to BESS 312 using power switching unit 320. In one embodiment, power switching unit 320 can transition among at least three states for providing energy: (i) a first state where energy is provided to the battery packs of BESS 312 from power grid 313 via one or more AC/DC modules; (ii) a second state where energy is provided to an electric vehicle from power grid 313 via one or more AC/DC modules and from BESS 312 via one or more DC/DC modules; and (iii) a third state where energy is provided to an electric vehicle from power grid 313 via one or more AC/DC modules. As should be apparent to a person skilled in the art, other states are within the scope of this disclosure. For example, power switching unit may include a fourth state where energy is provided to an electric vehicle from BESS 312 via one or more DC/DC modules without providing energy from power grid 313. Power switching unit 320 may be implemented using one or more switches (e.g., one or more tri-state switches), but is not limited thereto.

Charging unit 314 of FIG. 3 also comprises a vehicle charging indicator 307 that can be used to determine if an electric vehicle is being charged. For example, vehicle charging indicator 307 may measure current, voltage, power, or charge capacity to determine if a vehicle is currently being charged. This indicator may be implemented, for example, by a button or a limit switch on charging unit 314 such that, when depressed, it indicates that an electric vehicle is being charged. The status of this indicator may be communicated to battery system controller 302 within control/interface board 303. Subsequently, battery system controller 302 may use this status information, for example, to instruct the batteries within BESS 312 to discharge, and/or enable or disable the output of one or more DC/DC modules (e.g., DC/DC module 305). As another example, the battery system controller 302 determines if, when, or (optionally) at what rate to charge or discharge batteries in BESS 312 based on the status of indicator 307, the power level determined by charger controller 306 supplied by BESS 312, and/or the state of charge of the battery packs (e.g., battery pack 301).

Still considering FIG. 3, charge controller 306 may communicate with electric vehicle 309 via communication path 318. Charge controller 306 may also communicate with BESS 312 via communication path 319. Communication paths 318 and 319 may be any wired or wireless communication path known to those skilled in the art. For example, communication paths 318 and 319 may be CAN buses.

In charger controller 306, a communication interface is indicated by letter C and a power interface is indicated by letter P. Additionally, communication between charging unit 314 and BESS 312 may be realized by sending and receiving signals using communication bus 319. When a signal is sent to BESS 312, it may be received by interface card 311, which subsequently communicates this signal with battery system controller 302 in order to be processed and acted upon if necessary. Similarly, when a signal is sent to charging unit 314 using communication bus 319, it may be received and processed by processing unit 317 residing in charger controller 306 in order to be processed and acted upon if necessary.

In an embodiment, communication between charging unit 314 and BESS 312 includes charger controller 306 sending a signal to battery system controller 302 residing on control/interface board 303 to set a maximum power level to be output from the batteries. This maximum power level may be calculated by processing unit 317 within charge controller 306 based on the maximum power request or state of charge of the battery of electric vehicle 309.

In one example, battery-assisted electric vehicle charging system 300 is able to provide up to 50 kW of power to electric vehicle 309. In this example, charging system 300 may include two AC/DC modules 304, each capable of providing 10 kW of DC power to electric vehicle 309 from the power grid, and three DC/DC modules 305, each capable of providing 10 kW of DC power to electric vehicle 309 from BESS 312. Charging system 300 may be able to charge electric vehicle 309 in a fast charging mode (e.g., providing energy from both power grid 313 and BESS 312), or in a slow charging mode (e.g., providing energy from power grid 313 but not BESS 312). In this example, fast charging mode may provide up to 50 kW of power, whereas slow charging mode may provide up to 20 kW of power. As should be apparent to a person of skill in the art, the charging system 300 may provide other power values in the fast and slow charging modes, such as (but not limited to) 50 kW for fast charging and 10 kW for slow charging; 50 kW for fast charging and 30 kW for slow charging; 60 kW for fast charging and 30 kW for slow charging; 40 kW for fast charging and 20 kW for slow charging; and the like. And, as should be apparent to a person skilled in the art, any number of AC/DC modules and DC/DC modules may be included in a charging system to customize amount of power that is provided in the fast charging and slow charging modes. Charging system 300 may be able to provide power in increments of 1 kW, 5 kW, 10 kW, or any other increment.

Charging system 300 may also be able to gradually decrease or step down the amount of power being provided to electric vehicle 309 as the battery (or batteries) of the electric vehicle approach a fully-charged state (or achieve a threshold level of charge). In one example, an enable unit (e.g., enable unit 321 residing on interface card 311) may be used to control the number of active DC/DC modules in the charging system based on the specific amount of power requested by the electric vehicle. Typically, when an electric vehicle begins charging, its batteries are depleted or are low in charge, and therefore, three DC/DC modules (for example) may be enabled and used together with the two AC/DC modules (for example) to charge electric vehicle (e.g., provide 50 kW). Once the state of charge of the battery within electric vehicle reaches (for example) 50 percent charge, only two of the DC/DC modules may be enabled and used together with the two AC/DC modules to charge electric vehicle at a 40 kW rate. When the state of charge of the battery within electric vehicle reaches (for example) 70 percent charge, only one DC/DC module may be enabled and used together with the two AC/DC modules to charge electric vehicle at a 30 kW rate. Finally, when the state of charge of the battery within electric vehicle reaches (for example) 90 percent, none of the DC/DC modules may be enabled, and the two AC/DC modules may be used to charge the electric vehicle at a 20 kW rate. Considering the same example, if a second electric vehicle arrives and requests recharging shortly after the first electric vehicle has been charged, and the batteries within battery energy storage system are depleted, the battery-assisted electric vehicle charging system 300 may charge the second electric vehicle in the slow charging mode (e.g., by using 20 kW of power only provided by power grid 313). This way, the second electric vehicle can begin charging even though BESS 312 is temporarily unable to provide power.

The arrangement of the components of the example charging systems 300A and 300B of FIGS. 3A and 3B, respectively, corresponds to the example charging system 100A of FIG. 1A. However, a person of skill in the art would recognize that the components depicted in FIGS. 3A and 3B may be re-arranged and additional components may be added to implement the example charging systems 100B and 100C without departing from the scope of the disclosure.

Figure 4B:
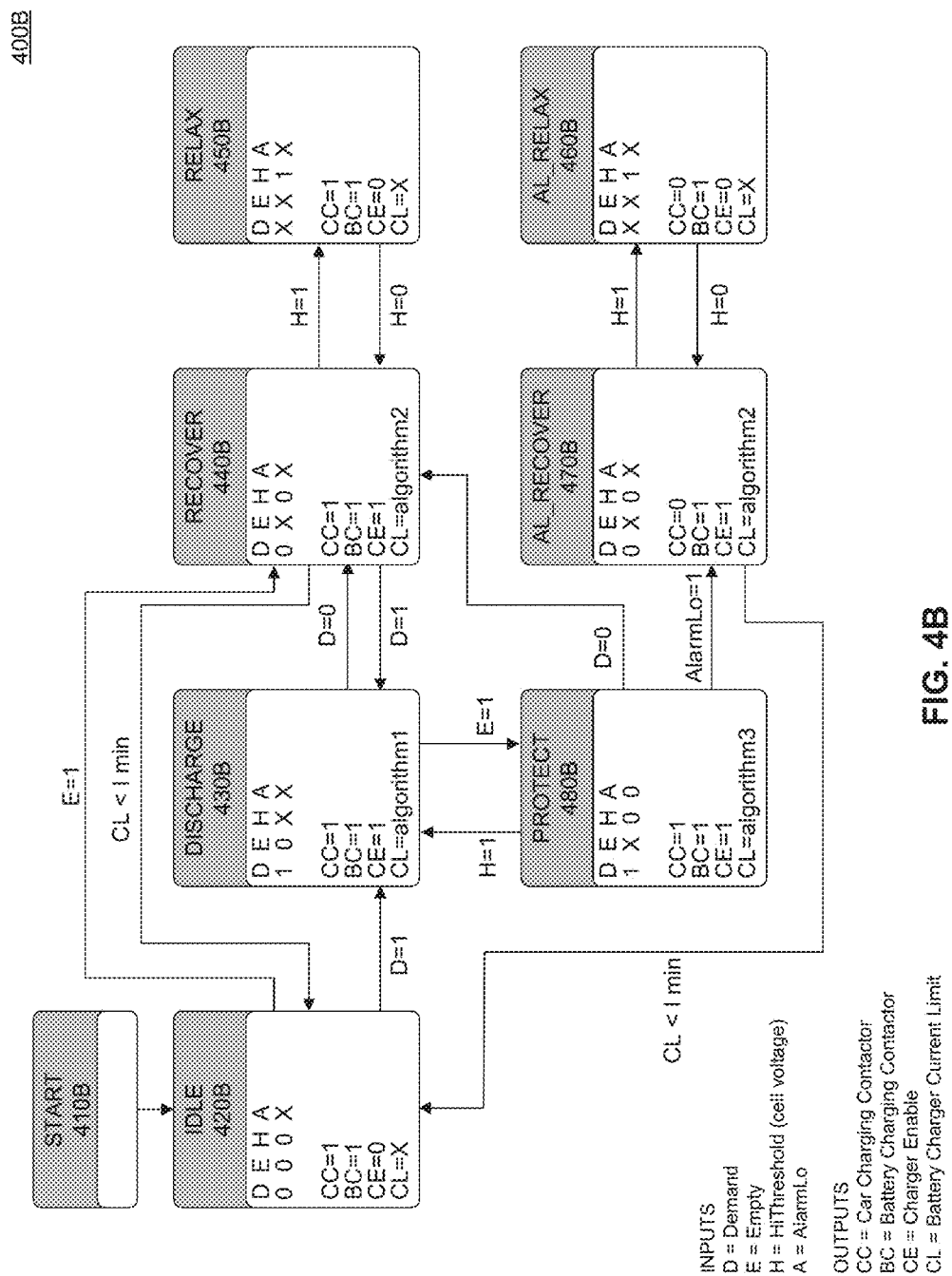
Figure 4C:
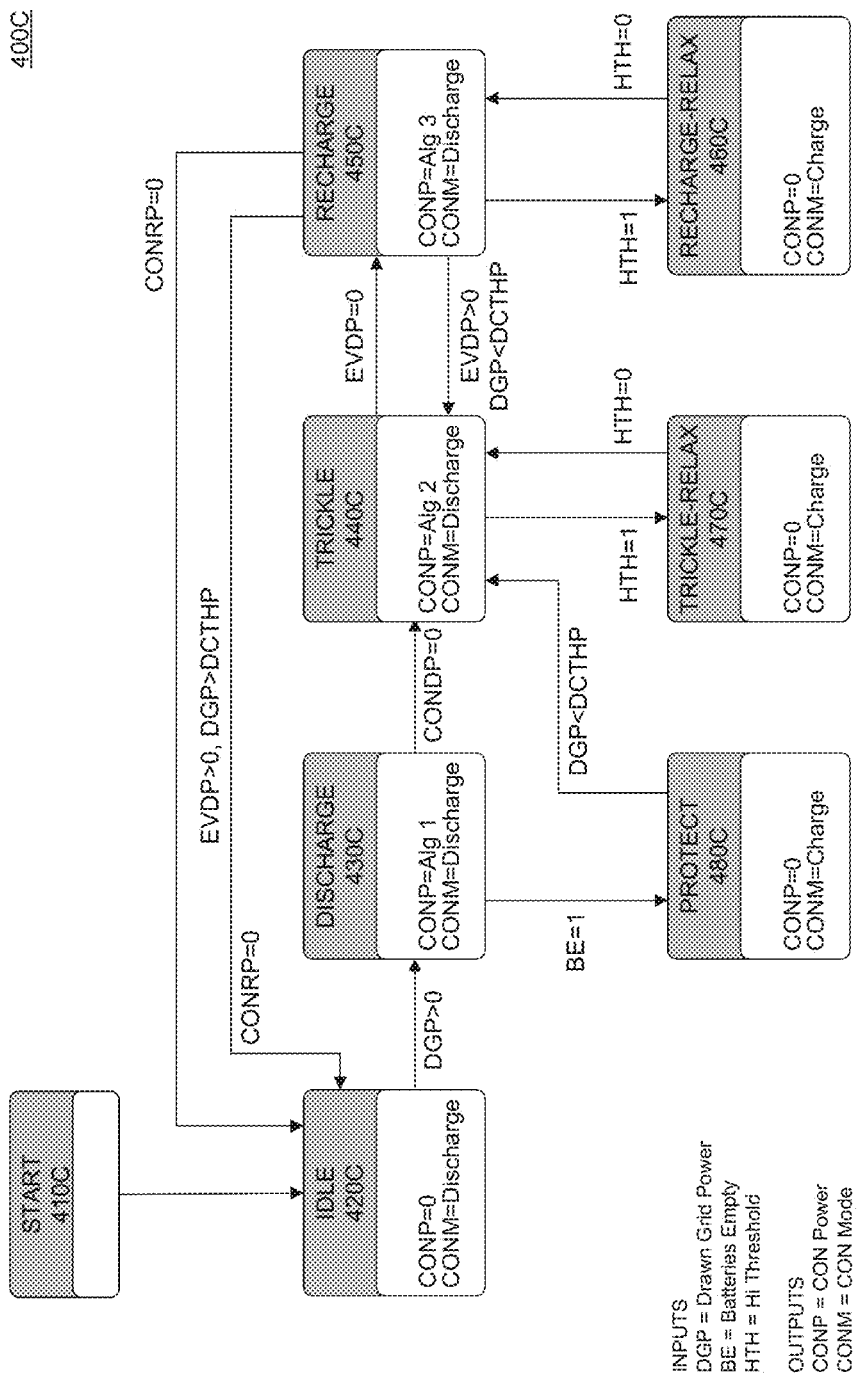

Turning to FIGS. 4A-4C, example state machines of a battery-assisted electric vehicle charging station according to example embodiments of the disclosure are illustrated. State machines 400A-400C illustrate various example operating states of a battery-assisted electric vehicle charging system and the conditions that cause the charging system to transition from one state to another. In FIGS. 4A-4C, each mutually exclusive state of state machines 400A-400C is associated with a set of input and output parameters. A change at an input parameter may trigger a transition to a different state. A state transition causes a change in at least one output parameter. Below, these input and output parameters are described in detail. State machine 400A of FIG. 4A corresponds to the charging system 100A of FIG. 1A and the charging systems 300A and 300B of FIGS. 3A and 3B, respectively. Thus, where appropriate, the discussion of FIG. 4A will refer to the systems depicted in FIGS. 1A, 3A, and 3B.

State machine 400A includes the following states: a "START" state 410A, an "IDLE" state 420A, a "DISCHARGE" state 430A, a "RECOVER" state 440A, a "RELAX" state 450A, and a "PROTECT" state 480A. The above set of state machine states act together to implement a control system that enables the use of single-phase AC power from the power grid. The addition of BESS enables the vehicle charging system to provide sufficient power to meet the expectations of a "quick charge" vehicle charging session. Without the BESS, a single-phase AC power grid connection cannot supply power at the rate needed to implement a "quick charge" function. Thus, with the addition of the BESS, the system is able to perform its function with a far less expensive grid connection. The state machine 400A of FIG. 4A may be implemented as computer readable code that is stored on a non-transient computer readable storage medium.

In FIG. 4A, the input parameters may include input variables, and/or system conditions. In one embodiment, these input parameters comprise a full signal ("F") that may indicate that all battery packs of a BESS have charged above a maximum threshold (e.g., have a voltage above a maximum voltage threshold), an empty signal ("E") that may indicate that all battery packs of a BESS have discharged below a minimum threshold (e.g., have a voltage below a minimum voltage threshold), and an electric vehicle present signal ("EVP") that may indicate that an electric vehicle is present at the charging station. For example, minimum voltage threshold E=1 may be 2.5V, whereas the maximum voltage threshold F=1 may be 3.65V.

In FIG. 4A, the output parameters may determine the operation of hardware components. For example, a first output parameter may control a contactor that, when closed, allows the batteries within a BESS to provide energy to the charging station. This output parameter may be referred to as Battery Contactor ("BATC"). Another output parameter controls a switch that can couple the BESS to the charging station or the electric vehicle to the charging station. This output parameter may be referred to as Power Switch ("SWP"). AC Current ("ACC") is another output parameter that indicates whether the power grid is providing AC power to the charging station. Additionally, state machine 400A may further use a forth output parameter, referred to as Current Limit ("CL"), which indicates the amount of current required to charge the BESS batteries.

The state machine 400A begins in START state 410A and transitions to IDLE state 420A, at which there is no charging or discharging of the BESS batteries. In IDLE state 420A, the battery system controller monitors the status of battery packs and waits for input conditions that indicate a need for a state change. For example, if the presence of an electric vehicle is detected (EVP=1), state machine 400A transitions from IDLE state 420A to DISCHARGE state 430A. As explained above, the presence of an electric vehicle at a charging station may be detected using a limit switch or like mechanism.

In DISCHARGE state 430A, the power switch is connected to EV ("SWP=EV") to connect the charging station to the electric vehicle, and the battery contactor is closed ("BATC=1") to allow BESS to provide energy to the electric vehicle via the charging station. That is. BESS batteries may be discharged to provide energy to an electric vehicle via the charging station, which may also provide energy to the electric vehicle via the power grid. As explained above, when the charging station provides energy to an electric vehicle via the power grid and the BESS, it may be considered "fast" or "quick" charging.

In this embodiment, the electric vehicle sends a request to the charging station for a certain amount of current to charge its batteries, and the charging station determines how to satisfy the request. That is, charging station determines how much energy to provide from the power grid and how much to provide from the BESS. In an embodiment, the charging station uses grid energy (up to a maximum amount, e.g., 20 kW) before it provides any energy from BESS.

State machine 400A transitions from DISCHARGE state 430A to RECOVER state 440 when the electric vehicle is no longer present (EVP=0). In RECOVER state 440A, power switch is connected to BAT ("SWP=BAT") to complete the connection between the charging station and the BESS so that the BESS batteries can be charged. In RECOVER state 440A, BESS batteries are charged using energy from the power grid. The charging station determines the amount of current to draw from the power grid to charge BESS batteries using algorithm 1 ("alg. 1"), which is described in more detail with respect to FIG. 4B. In state machine 400A, charging an electric vehicle has priority over charging the BESS batteries. Thus, if an electric vehicle becomes present at the charging station ("EVP=1") while in RECOVER state 440A, state machine 400A transitions back to DISCHARGE state 430A.

State machine 400A transitions from RECOVER state 440A to RELAX state 450A when BESS batteries are full (F=1), i.e., have reached or exceeded a maximum threshold. In RELAX state 450A, charging station stops charging BESS batteries to allow the voltage of BESS batteries to fall back below the maximum threshold (F=0). State machine 400A transitions from RELAX state 450A to RECOVER state 440A to resume charging BESS batteries when the voltage of BESS batteries falls back below the maximum threshold (F=0).

State machine 400A transitions from RECOVER state 440A to IDLE state 420A when the current limit (i.e., amount of current required to charge the BESS batteries) falls below a minimum current ("CL<1 min"), indicating that the BESS batteries are charged and algorithm 1 has completed. In some embodiments, 1 min equals 10 Amps.

Returning to DISCHARGE state 430A, state machine 400A transitions from DISCHARGE state 430A to PROTECT state 480A when the empty signal is true (E=1), indicating that BESS batteries have discharged below a minimum threshold. In PROTECT state 480A, battery contactor is opened ("BATC=0") to disconnect BESS from the charging unit so that BESS cannot provide energy to the charging unit. In PROTECT state 480A, the electric vehicle may still be charged by power from the power grid. As discussed above, this may be considered a "slow" charging mode. In this embodiment, charging the electric vehicle has higher priority than charging BESS batteries, and thus state machine 400A remains in PROTECT state 480A until the electric vehicle is not present ("EVP=0"). When the electrical vehicle is not present ("EVP=0"), state machine 400A transitions to RECOVER state 440A.

Turning to FIG. 4B, state machine 400b corresponds to the charging system 100B of FIG. 1B. Thus, where appropriate, the discussion of FIG. 4B will refer to the system depicted in FIG. 1B. State machine 400B includes the following states: a "START" state 410B, an "IDLE" state 420B, a "DISCHARGE" state 430B, a "RECOVER" state 440B, a "RELAX" state 450B, an alarm-relax state ("AL_RELAX") 460B, an alarm-recover state ("AL_RECOVER") 470B, and a "PROTECT" state 480B. State machine 400B may also include a "TEST" state and a "BALANCE" state, which are described below. The above set of state machine states act together to implement a control system that enables the use of single-phase AC power from the power grid. The addition of BESS enables the vehicle charging system to provide sufficient power to meet the expectations of a "quick charge" vehicle charging session. Without the BESS, a single-phase AC power grid connection cannot supply power at the rate needed to implement a "quick charge" function. Thus, with the addition of the BESS, the system is able to perform its function with a far less expensive grid connection. The state machine 400B of FIG. 4B may be implemented as computer readable code that is stored on a non-transient computer readable storage medium.

In FIG. 4B, the input parameters may include input variables, and/or system conditions. In one embodiment, these input parameters comprise a demand signal ("D") that may indicate a charge request by an electric vehicle, and an empty signal ("E") that may indicate that all battery packs of a BESS have discharged below a first minimum threshold (e.g., have a voltage below a first minimum voltage threshold). Furthermore, input parameters received at a battery system controller within a BESS may further comprise a high threshold signal ("H") that may indicate that the voltage of one of the batteries inside one of the battery packs has exceeded a pre-determined maximum voltage threshold, and an alarm low signal ("A") that may indicate that the voltage of one of the batteries inside one of the battery packs has fallen below a second minimum voltage threshold (e.g., smaller than the first minimum voltage threshold that sets empty signal E). For example, minimum voltage threshold setting E=1 may be 2.5V, whereas the minimum voltage threshold setting A=1 may be 2.0V, and the maximum voltage threshold setting H=1 may be 3.65V.

In FIG. 4B, the output parameters may determine the operation of hardware components. For example, a first output parameter may control a contactor that, when closed, allows the batteries within a BESS to be charged by the power grid. This output parameter may be referred to as Battery Charging Contactor ("BC"). In addition, another output parameter may cause a contactor to close, allowing output of DC current to an electric vehicle via the car charger. This output parameter may be referred to as Car Charging Contactor ("CC"). Another system output enables or disables the AC/DC converter. This output may be referred to as Charger Enable ("CE"). Additionally, state machine 400b may further use a forth output parameter, referred to as Current Limit ("CL"), which indicates the amount of current that is required to be used in charging the batteries in a BESS. The CL value may fall between (inclusive) a low boundary value $I_{min}$ and high boundary value $I_{max}$ (e.g., $I_{min} \leq CL \leq I_{max}$). For example, $I_{min}$ may be set to 10 Amps and $I_{max}$ may be set to 50 Amps. As should be apparent to a skilled artisan, other input and output parameters may be used and are within the scope of this disclosure.

The state machine 400B begins in START state 410B and transitions to IDLE state 420B, at which there is no charging or discharging of the batteries within the BESS. In IDLE state 420B, the battery system controller monitors the status of battery packs and waits for input conditions that indicate a need for a state change. For example, if a charge demand (D=1) is detected, or a critically low state of charge (A=1) is observed on a battery pack, a transition is made from IDLE state 420B to a different state.

State machine 400B further comprises a "DISCHARGE" state 430B, at which the electric vehicle is charging via energy provided by the power grid and the BESS. In an embodiment, the value of current limit CL used to charge the electric vehicle is determined based on the current required by the electric vehicle, as follows: a signal is sent by the electric vehicle to the charging station indicating the state of charge of the electric vehicle. This information is used by a charging unit within the charging station to calculate the rate at which the electric vehicle should be charged. Part or all of this specified charging rate may be provided by the BESS.

In an embodiment, the maximum power provided by the power grid is limited to a certain threshold level, e.g., 20 kW. In this embodiment, a mechanism such as closed loop may be used by the charging station to maintain the power drawn from power the grid below the set threshold level. Furthermore, in this embodiment, the charging station determines the amount of power, required to be provided by the BESS based on the power demanded by the electric vehicle. Typically, the voltage provided by the battery packs within the BESS is fixed, and the determined power may be used to specify the required current limit CL. This method of setting the value of power delivered to the electric vehicle, and the corresponding CL is referred to as "algorithm 1" in FIG. 4. In this embodiment, the charging station may subsequently send this information to the BESS. This information may be processed and used by the battery system controller to determine the discharge rate of the battery packs within the BESS. As would be understood by a person of skill in the art, algorithm 1 is a non-limiting example and other algorithms are within the scope of this disclosure.

Still considering FIG. 4B, in an embodiment, the battery-assisted electric vehicle charging system may affect a decrease in the charging rate of the electric vehicle when the electric vehicle is charged above a certain threshold level. For example, the charging station may disable one or more DC/DC modules when the electric vehicle reaches a state of charge above a certain threshold level. Additionally or alternatively, a battery system controller may set different discharge rates for the battery packs within the BESS for different charge states of the electric vehicle. For example, in an initial state, a first rate, e.g., 0.6 C, may be used to charge the electric vehicle, whereas this rate may be decreased to a second rate, e.g., 0.4 C, when the electric vehicle battery is 50% full, and further decreased to a third rate, e.g., 0.3 C, when the electric vehicle battery is 70% full.

State machine 400B further comprises a "RECOVER" state 440B at which there is no request for charge from the electric vehicle (D=0), and the BESS uses all the power provided by the power grid to recharge the battery packs therein using power provided by the power grid.

State machine 400B further comprises a "RELAX" state 450B. In RELAX state 450B charging of the battery packs within the BESS is stopped (CE=0) to allow the voltage of batteries within all the battery packs to fall back below the pre-determined maximum threshold.

In an embodiment, a transition may be made from RECOVER state 440B to RELAX state 450B. This transition is made if a signal is received by the battery system controller that indicates a voltage above the predetermined maximum threshold observed on one of the batteries within the BESS (i.e., H=1) while charging the batteries within battery packs.

Additionally, a transition may be made from RELAX state 450B to RECOVER state 440B if input parameter H is set to zero (signifying that no battery within any battery pack has a voltage above the pre-determined maximum threshold) by resuming charging the batteries on the BESS (CE=1) at a decreased rate. The transition from RECOVER state 440B to RELAX state 450B and vice versa may occur multiple times until batteries cannot be charged any further. For example, after each transition from RELAX state 450B to RECOVER state 440B, the current limit CL is set to a further decreased value until it reaches the lower current limit (CL=$I_{min}$).

If while charging batteries in RECOVER state 440B using the lower current limit (CL=$I_{min}$), a change in the value of input parameter H from 0 to 1 is observed at the battery system controller within the battery energy storage system, indicating that at least one of the batteries within at least one battery pack has a voltage above the pre-determined maximum voltage, a transition is made to RELAX state 450B. Subsequently, once the cell voltage of batteries in the battery packs fall back to normal state, and input parameter H is set to 0 again, the value of CL is decreased. Since this decrease results in the value of CL to fall below the lower current limit (CL=$I_{min}$), the charging process is discontinued and a transition is made from RECOVER state 440B to IDLE state 420B, as the batteries within the battery energy storage system are now fully charged. The procedure for determining the value of CL while transitioning from RELAX state 450B to RECOVER state 440B is referred to in FIG. 4 as "algorithm 2."

Still considering FIG. 4B, state machine 400B further comprises "PROTECT" state 480B. In PROTECT state 480B, the electric vehicle demands charge (i.e., D=1), while input parameter empty is also set (i.e., E=1) indicating that the voltage of at least one of the batteries within the battery packs has fallen below the first minimum threshold level (but not below the second minimum threshold that sets alarm input parameter A to 1). In this state, if possible, all of the charge required by the electric vehicle is provided by the power grid via an AC/DC converter, e.g., AC/DC converter 108. If however the charging rate required by the electric vehicle (e.g., the value of current) is higher than can be feasibly provided by the power grid through the AC/DC power module (due to the maximum power delivery limitation of the AC/DC power module itself), then the charging rate provided by the BESS (e.g., the current provided to the electric vehicle) is set to the maximum, e.g., by setting the current to a maximum current limit (CL=$I_{max}$). Because the power provided by the AC/DC power module is not sufficient to prevent the batteries from still realizing some power draw, the batteries will continue to lose charge. This method of setting CL is referred to as "algorithm 3" in FIG. 4B. After a duration of time at which the batteries continue to lose charge, the state of charge (e.g., voltage) of batteries within one or more battery packs within the battery energy storage system will gradually fall below a second minimum voltage threshold (i.e. results in A=1), which will cause a transition to "ALARM-RECOVER" state 470B.

In ALARM-RECOVER state 470B, batteries within the battery packs are charged using the energy provided by the power grid, while output parameter AC is set to 0 to prevent any further discharge of the battery packs, until algorithm 2 completes and the batteries are fully charged.

Similar to the iterative transitions made between RECOVER state 440B and RELAX state 450B, transitions may also be made between ALARM-RECOVER state 470B and ALARM-RELAX state 460B. The transition from ALARM-RECOVER state 470B to ALARM-RELAX state 460B is made by stopping the charging of the batteries within the battery packs of the BESS, whenever during charging these batteries, the value of input signal H changes from 0 to 1, indicating that at least one of these batteries has a voltage above the pre-determined maximum voltage.

In ALARM-RELAX state 460B, charging batteries within the BESS is stopped (CE=0), any new charge demand by an electric vehicle will be denied (AC=0), and the voltage of the batteries within the battery packs are allowed to fall back to normal level.

Furthermore, a transition may be made from ALARM-RELAX state 460B to ALARM-RECOVER state 470B, when the value of input signal H changes from 1 to 0. When this transition occurs, charging of the battery packs is resumed at a decreased rate (by decreasing the value of CL). However demand for charge from the electric vehicle is still denied (AC=0) at ALARM-RECOVER state 470B. Again, if the value of CL falls below the lower current limit (CL=$I_{min}$), a transition is made from ALARM-RECOVER state 470B to IDLE state 420B, as the batteries within the BESS are now fully charged. The procedure for decreasing the value of CL while transitioning from ALARM-RELAX state 450B to ALARM-RECOVER state 470B is also "algorithm 2."

Still considering FIG. 4B, state machine 400B may further comprise a "BALANCE" state that can only be entered through manual intervention of an operator from a command line interface. In this state, the operator may determine a balance target for testing the operation of the whole battery-assisted electric vehicle charging system, e.g., system 100B. Similarly, state machine 400B may also comprise a "TEST" state that also can only be entered via manual intervention of an operator from a command line interface. TEST state may be used by a technician to test different operations of the battery-assisted electric vehicle charging system without interference from the activities of the rest of the states in state machine 400B.

The transitions between different states of state machine 400B and the value of input and output parameters at each state are fully illustrated in FIG. 4B. The descriptions above were provided for further clarification.

Turning to FIG. 4C, state machine 400C corresponds to electric vehicle charging station 100C depicted in FIG. 1C. State machine 400C includes the following states: a "START" state 410C, an "IDLE" state 420C, a "DISCHARGE" state 430C, a "TRICKLE" state 440C, a "RECHARGE" state 450C, a "RECHARGE-RELAX" state 460C, a "TRICKLE-RELAX" state 470C, and a "PROTECT" state 480C. The state machine of FIG. 4C may be implemented as computer readable code that is stored on a non-transient computer readable storage medium.

In FIG. 4C, the input parameters may include input variables, and/or system conditions. In one embodiment, these input parameters comprise a drawn grid power signal ("DGB") that indicates the power provided by a power grid to an electric vehicle charging system, and a battery empty signal ("BE") that may indicate that one or more battery packs within a BESS have discharged below a minimum threshold (e.g., have a voltage below a minimum voltage threshold). Furthermore, input parameters received at a battery system controller within the BESS may further comprise a high threshold signal ("HTH") that may indicate that the voltage of one of the batteries inside one of the battery packs has exceeded a pre-determined maximum voltage threshold. For example, a minimum cell voltage threshold defined for BE=1, may be 2.0V, and the maximum cell voltage threshold setting HTH=1 may be 3.65V.

The output parameters may determine the operation of hardware components. For example, a first output parameter "CONP" may control the amount of energy flowing through a bidirectional AC/DC converter (e.g., bi-directional AC/DC converter 108 of FIG. 1C). A second output parameter "CONM" may determine the mode of operation of a bi-directional AC/DC converter. For example, in a first mode (discharge mode) energy flows from the BESS batteries to supplement grid power to be provided to an electric vehicle.

Still considering FIG. 1C, several condition parameters may control the transition between various states of state machine 400C. For example, a first condition parameter "EVDP" may indicate the amount of power demanded by the electric vehicle. A second condition parameter "CONDP" may indicate the amount of discharge power flowing through the bi-directional AC/DC converter. This amount of discharge power is provided by the BESS to the electric vehicle being charged. A third condition parameter "CONRP" may indicate the amount of recharge power flowing through the bi-directional AC/DC converter. This amount of recharge power is provided by the power grid to the BESS to recharge the batteries therein. A fourth condition parameter "DCTHP" may indicate demand charge threshold power. This parameter indicates the maximum amount of power that is to be drawn from the power grid at a time to charge an electric vehicle or to charge the BESS. Below, the various states mentioned above are described in further detail.

Still considering FIG. 4C, state machine 400C begins in START state 410C and transitions to IDLE state 420C, at which there is no charging or discharging of the batteries within the BESS. In IDLE state 420C, the battery system controller monitors the status of battery packs and waits for signals from a charging unit. For example, if an indication of a nonzero drawn grid power (DGP>0) is received from the power meter, a transition is made from IDLE state 420C to a different state.

State machine 400C further comprises a DISCHARGE state 430C at which the electric vehicle is charging via the energy provided by the power grid and the BESS. In an embodiment, while at the DISCHARGE state 430C, the value of the drawn grid power DGP is determined, e.g., by using a system power meter.

Typically, the voltage provided by the battery packs within the BESS is fixed. Therefore, in an embodiment, in order to determine the demanded power by the electric vehicle (EVDP), the value of current limit CL required to charge the electric vehicle is determined based on the current required by the electric vehicle, as follows: a signal is sent by the electric vehicle to the electric vehicle charging station indicating the state of charge of the electric vehicle. This information may be used by the charging station to calculate the rate at which the electric vehicle should be charged. In this embodiment, the charging station may subsequently send this information to the BESS. This information may be processed and used by the a battery system controller within the BESS to determine the discharge rate of the battery packs within the BESS.

While at the DISCHARGE state 430C, part of the demanded power by the electric vehicle EVDP may be provided by the power grid. As mentioned previously, the value of demand charge threshold power DCTHP determines the maximum amount of power delivered by the power grid (using the bi-directional AC/DC converter). In order to reduce DGP (the drawn grid power) to a value smaller than or equal to DCTHP, the difference between DGP and DCTHP (obtained by subtracting DCTHP from DGP) should be provided by the BESS, previously charged using the energy provided by the power grid.

Still considering FIG. 4C, while at the DISCHARGE state 430C, a mechanism such as a closed feedback loop may be used by the electric vehicle charging system, e.g., system 100C, to maintain DGP, the power drawn from the power grid, below the set threshold level and ensure that the rest of the demanded power is supplied by the BESS. This algorithm is referred to algorithm 1 in the state machine 400C. In an example, the quantity obtained from subtracting DCTHP from DGP may be used to adjust the bi-directional AC/DC converter setting. A positive value of this quantity would indicate that the bi-directional AC/DC converter discharge power should be increased by the obtained value of this quantity. Similarly, a negative value of this quantity would indicate that the bi-directional AC/DC converter discharge power should be reduced by the obtained value of this quantity. Finally, if the discharge power adjustment causes the bi-directional AC/DC converter discharge power to become negative, the algorithm is terminated. As would be understood by a person of skill in the art, "algorithm 1" is a non-limiting example and other algorithms are within the scope of this disclosure.

During a charging session, the DGP eventually decreases as the state of charge of the batteries within the electric vehicle increases. Therefore, DGP eventually becomes smaller than DCTHP. In an embodiment, the battery-assisted electric vehicle charging system may affect a decrease in the discharging rate of the BESS batteries as the electric vehicle demands less power. For example, the charging station may disable one or more AC/DC modules when the electric vehicle reaches a state of charge above a certain threshold level. Additionally or alternatively, the battery system controller may set different discharge rates for the battery packs within the BESS for different charge states of the electric vehicle. For example, in an initial state, a first rate, e.g., 0.6 C, may be used to charge the electric vehicle, whereas this rate may be decreased to a second rate, e.g., 0.4 C, when the electric vehicle battery is 50% full, and further decreased to a third rate, e.g., 0.3 C, when the electric vehicle battery is 70% full Still considering FIG. 4C, the state machine 400C further comprises a PROTECT STATE 480C. While at the PROTECT state 480C, the batteries within the BESS are actively protected from being over-discharged. For example, if the cell voltage of a battery in one of the battery packs within the BESS drops below a Low Cell Voltage Threshold (e.g., 1.8 V), the state machine may transition from the DISCHARGE state 430C to PROTECT state 480C. In this state, the bi-directional AC/DC converter does not discharge the batteries within the battery energy storage system. In PROTECT state 480C, the drawn grid power DGP may exceed the demand charge threshold DCTHP, since the batteries within the BESS are not able to supplemental the power provided by the power grid if the demanded power EVDP is greater than DCTHP.

The system remains in the PROTECT state 480C until the drawn grid power DGP drops below the demand charge threshold DCTHP, at which point all of the demanded power may be supplied by the power grid. Subsequently, the state machine will transition to the TRICKLE state 440C, where a part of the power provided by the power grid may be used to recharge the batteries within the BESS.

At TRICKLE state 440C, a part of the power provided by the power grid may be used to recharge the batteries within the BESS, while the rest of the power provided by the power grid is used to charge the electric vehicle. The maximum power that may be provided by the power grid in the TRICKLE state 440C is DCTHP. While at TRICKLE state 440C, an algorithm indicated as algorithm 2 in FIG. 4C is used to determine the amount of power provided to the BESS using the bi-directional AC/DC converter in charge mode (CONM=charge).

Algorithm 2 enforces the temperature constraint on the batteries within the BESS. That is, it ensures that the batteries within the BESS are not discharged if any cell (a cell within a battery pack) temperature is below a certain temperature threshold, e.g., −10 C. For example, in algorithm 2, all cell temperatures are checked, and if the cell temperature of any of the batteries within a battery pack is below a certain temperature threshold, a warm-up operation is performed to increase the cell temperature. Once the minimum cell temperature constraints are satisfied, the batteries within the BESS are charged using a charging power obtained from subtracting DGP from DCTHP, as long as a high cell threshold voltage has not yet been detected. This difference may be recalculated in every pass of the control loop. The difference between DGP and DCTHP gradually increases (DGP becomes smaller) as the batteries within the electric vehicle acquire a higher state of charge and thus require less power during the charging session. The maximum DGP used to charge the batteries within the BESS in this state is determined by the maximum charging power allowed for the specific battery type being used.

During the operation of algorithm 2, the charging of the batteries within the BESS is halted as soon as a cell voltage of a battery within a battery pack exceeds the high cell voltage threshold HTH. After a high cell voltage condition is determined, a transition is made to the TRICKLE-RELAX state 470C. Additionally, a flag may be set before the transition to the TRICKLE-RELAX state 470C to indicate that the charging power used to charge the batteries within the BESS should be reduced, e.g., by 20%, when it returns from the TRICKLE-RELAX state 470C back to the TRICKLE state 483. As would be understood by a person of skill in the art, algorithm 2 is a non-limiting example and other algorithms are within the scope of this disclosure.

The state machine 400C will transition from the TRICKLE state 440C to the TRICKLE-RELAX state 470C if while recharging of the batteries within the BESS in the TRICKLE state 440C, the cell voltage of a battery within the BESS exceeds the HTH (High Threshold). The TRICKLE state 440C may also be transitioned to from the PROTECT state 480C as described above. Furthermore, the TRICKLE state 440C may be transitioned to from the DISCHARGE state 430C whenever the bi-directional AC/DC converter discharge power CONDP is determined to be zero (e.g., as determined by algorithm 1).

Additionally, if the RECHARGE state 450C is entered while the drawn grid power DGP does not exceed the demand charge threshold DCTHP, the state machine 400C will immediately transition to the TRICKLE state 440C.

The TRICKLE-RELAX state 470C may be considered as an auxiliary state for the TRICKLE state 440C. That is, as described previously, when any cell voltage of a battery within the BESS exceeds the High Cell Voltage Threshold HTH, a transition is made from the TRICKLE state 440C to the TRICKLE-RELAX state 470C. In the TRICKLE-RE- LAX state 470C, the cell voltages are allowed to relax back below the high threshold HTH. In this state, the bi-directional AC/DC converter is disabled and power is neither provided to the electric vehicle nor to the BESS. Additionally, a flag may be set to indicate that the charging current limit should be lowered. A transition from the TRICKLE-RELAX state 470C to the TRICKLE state 440C is made as soon as the cell voltage of all the batteries within the BESS relaxes back to a voltage below the HTH threshold. During this transition, a new and lower charging current limit CL is set to be provided by the bidirectional AC/DC converter.

The cycle of transitions between the TRICKLE state 440C and the TRICKLE-RELAX state 470C is repeated until the algorithm produces a current limit CL that is lower than the bi-directional AC/DC converter is capable of delivering. When this condition occurs, the state machine 400C transitions from TRICKLE state 440C to the IDLE state 420C, as the batteries within the BESS are now fully charged. Notably, it is not very likely that the battery charging algorithm (algorithm 2) in the TRICKLE state 440C will complete before the electric vehicle charging session completes.

Still considering FIG. 4C, the state machine 400C further comprises a RECHARGE state 450C. At RECHARGE state 450C, an amount of power bounded from above by the DCTHP is available for recharging the batteries within BESS. The state machine 400C transitions to the RECHARGE state 450C from TRICKLE state 440C when the electric vehicle charging session terminates either by a customer or by the electric vehicle charging station. When the charging session terminates, the EVDP (Electric Vehicle Demanded Power) becomes zero.

An algorithm, indicated as algorithm 3 in FIG. 4C, is used to set the charging power delivered to the batteries within the BESS using the bi-directional AC/DC converter. This algorithm may be used for recharging the batteries within the BESS. Instead of using a constant voltage, algorithm 3 uses an artificial current decay method for recharging the batteries within the BESS. The artificial current decay operates by reducing the charging current used to charge the batteries within the BESS by a pre-determined percentage, e.g., 20%, every time a cell (a cell within a battery pack inside the battery energy storage system) voltage exceeds the high voltage threshold HTH. Algorithm 3 terminates when the calculated charging power drops below the minimum power threshold that can be provided by the bi-directional AC/DC converter.

The operation of algorithm 3 is started by checking the cell temperature of all the cells within the batteries inside the BESS. If the temperature of one of the cells is lower than a pre-determined threshold, a warm up operation is performed. Subsequently, the batteries within the BESS are charged using the energy provided by the power grid. The current used for charging the batteries within the BESS is initially set to the maximum current available. Charging at the maximum current is halted once a high cell voltage threshold HTH is detected. Once the high cell voltage threshold value is detected for the first time, the charging current is reduced by a predetermined percentage, e.g., 20%. This method of reducing the charging current is repeated every time a high cell voltage is detected. This part of the algorithm is accompanied by the iterative transitioning of the state machine 400C between the RECHARGE state 450C and RECHARGE-RELAX state 460C.

Still considering FIG. 4C, in an embodiment, the initial checking of the cell temperatures in algorithm 3 is performed according to the following scheme. The current allowed for charging the batteries may be adjusted based on the worst case (lowest or highest) battery cell temperature within the batteries of the BESS. For example, in the adjustment of charging current, a first check may be made to determine whether any cell temperature is less than 5 degrees Celsius. If this determination is made, then the cells are warmed up and checked again. A second check may be made to determine whether a cell temperature is between 5 and 10 degrees Celsius, upon which case the maximum charging current is set to 8 Amps (0.1 C). A third check may be made to determine whether all cell temperatures are between 10 and 45 degrees Celsius, upon which case the maximum current charge is set to the full amount of 24 Amps (0.3 C). Finally, a fourth check may be made to determine if any cell temperature is above 50 degrees Celsius, upon which case the charging is halted. As would be understood by a person of skill in the art, algorithm 3 is a non-limiting example and other algorithms are within the scope of this disclosure.

A transition may be made from the RECHARGE state 450C to either the TRICKLE state 440C or to the DISCHARGE state 430C, once a new electric vehicle charging session is initiated, depending on the current value of drawn grid power DGP. That is, if DGP is smaller than DCTHP, a transition is made to the TRICKLE state 440C, allowing energy to be provided to both the electric vehicle that initiated the charging session, and to the BESS. If on the other hand, DGP is greater than DCTHP, a transition is made to the DISCHARGE state 430C, wherein the BESS is required to supplement the energy provided by the power grid to meet the charging demand of the electric vehicle (EVDP).

A transition may be made from the RECHARGE state 450C to the IDLE state 420C, if the charging algorithm 3 completes, and all the batteries within the BESS are fully charged.

Still considering FIG. 4C, the state machine 400C further comprises a RECHARGE-RELAX state 460C. This state is substantially similar to the TRICKLE-RELAX state 470C except that the RECHARGE-RELAX state 460C is auxiliary to the RECHARGE state 450C, instead of to the TRICKLE state 440C. The state machine 400C iteratively transitions between the RECHARGE state 450C and the RECHARGE-RELAX state 460C until the charging algorithm (algorithm 3 previously described) is completed.

The transitions between different states of state machine 400C and the value of input and output parameters at each state are fully illustrated in FIG. 4C. The descriptions above were provided for further clarification.

Figure 5A:
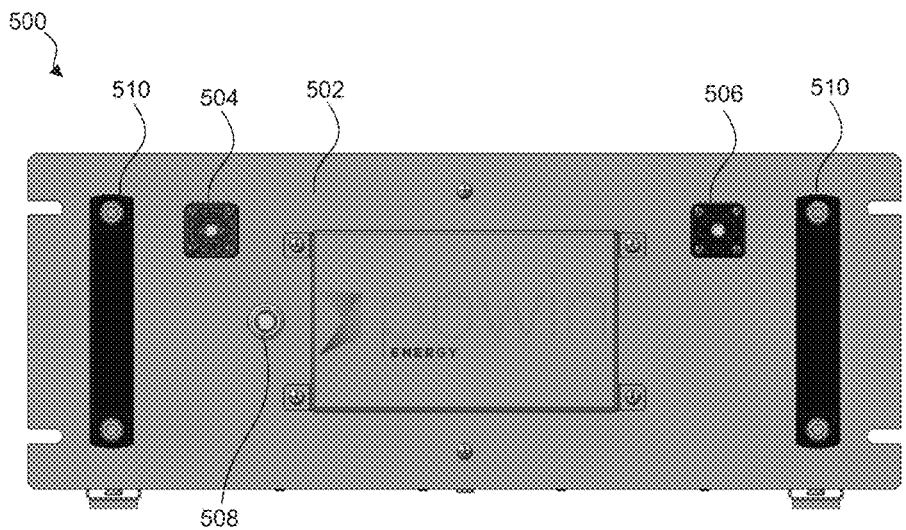
FIGS. 5A, 5B, 5C, and 5D are diagrams illustrating an example battery pack.
Figure 5B:
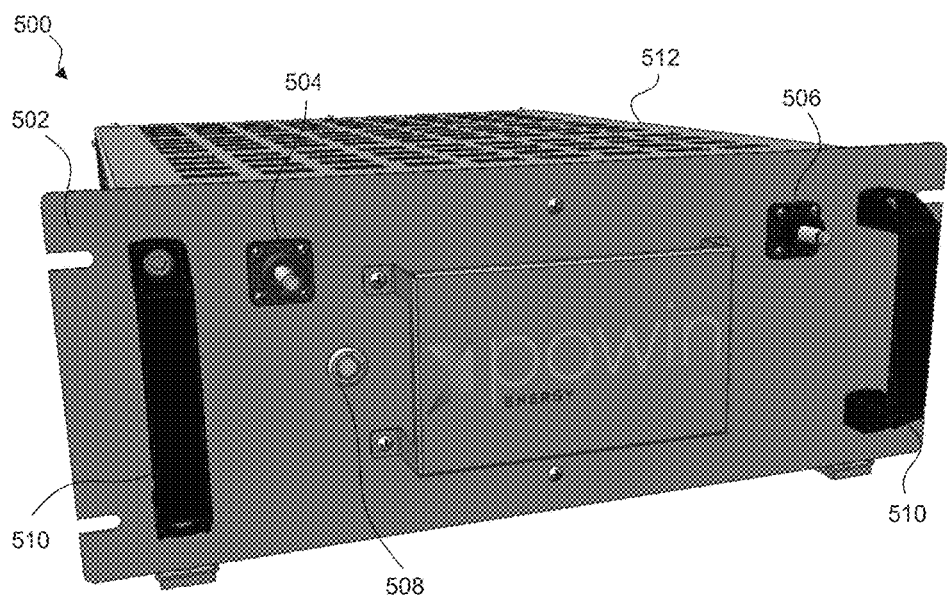
Figure 5C:
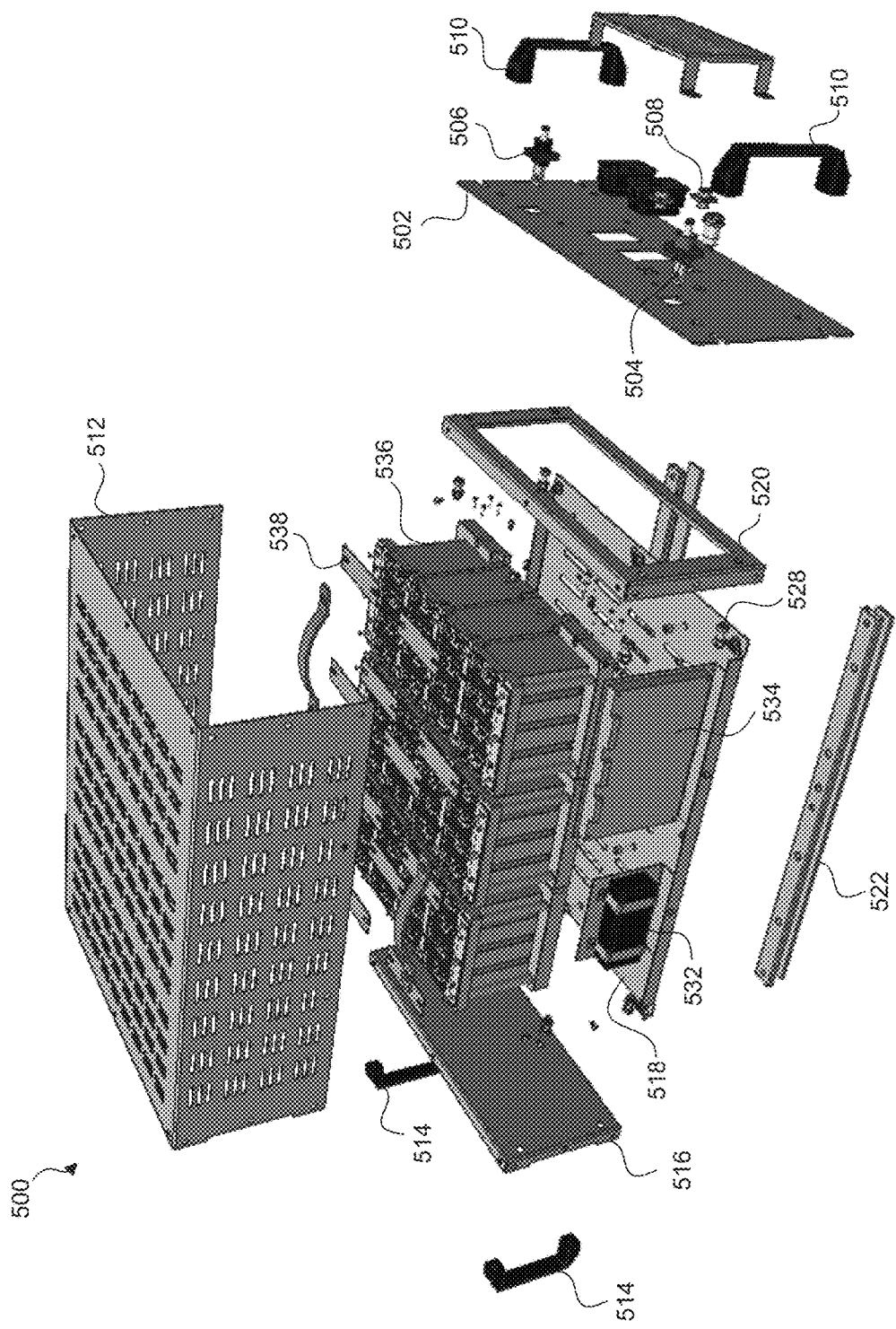
Figure 5D:
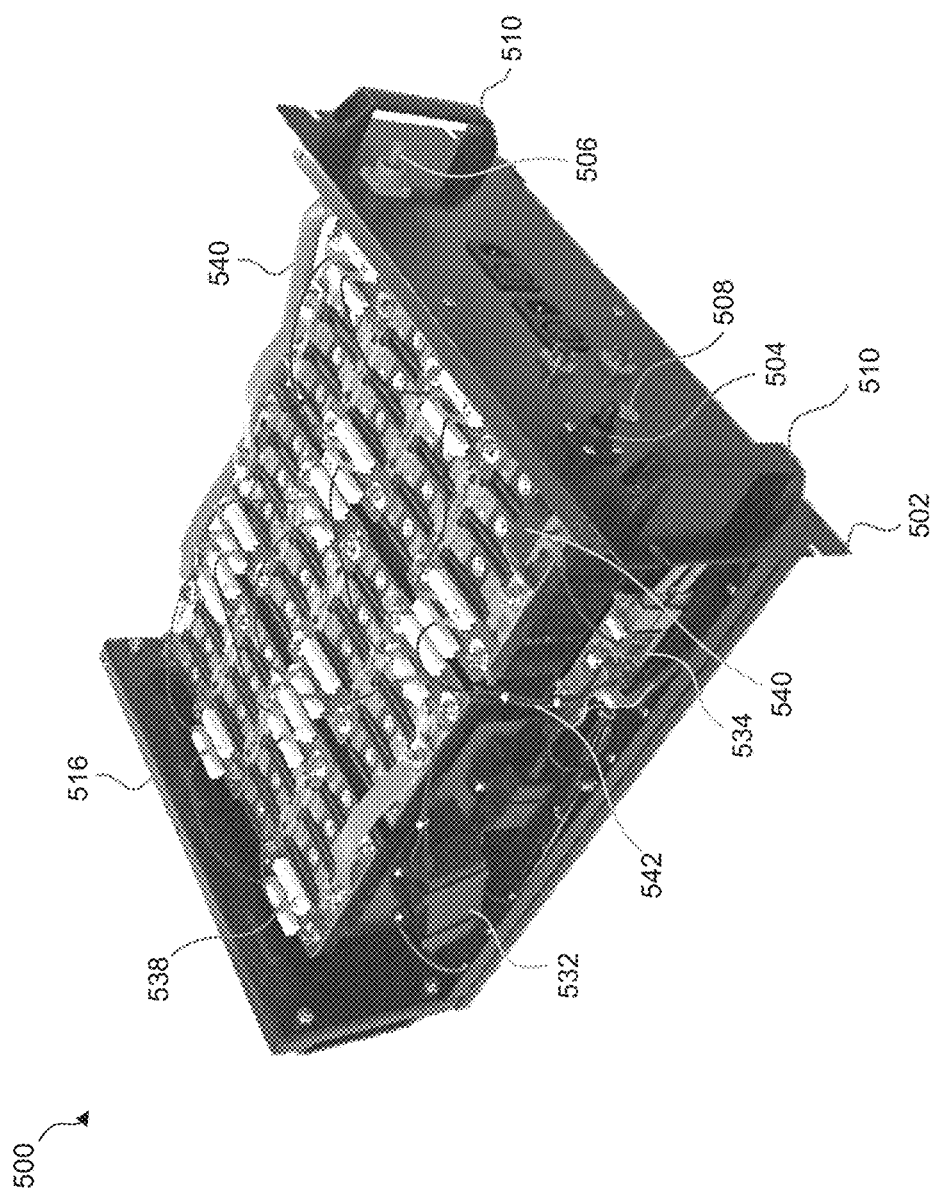

FIGS. 5A, 5B, 5C, and 5D are diagrams illustrating an example battery pack 500 according to an embodiment of the disclosure. Specifically, FIGS. 5A and 5B depict front views of battery pack 500, FIG. 5C depicts an exploded view of battery pack 500, and FIG. 5D depicts a front and side view of battery pack 500. As shown in FIGS. 5A-D, the housing of battery pack 500 may include a front panel 502, a lid or cover 512, a back panel 516, and a bottom 518. The lid 512, which includes left and right side portions, may include a plurality of air vents to facilitate air flow through battery pack 500 and aid in cooling the internal components of battery pack 500. In a non-limiting embodiment, the lid 512 is "U"-shaped and may be fabricated from a single piece of metal, plastic, or any other material known to one of ordinary skill in the art. The battery packs of the BESS embodiments described above may be implemented as described in accordance with battery pack 500 of FIGS. 5A-D.

The housing of battery pack 500 may be assembled using fasteners 528 shown in FIG. 5C, which may be screws and bolts or any other fastener known to one of ordinary skill in the art. The housing of battery pack 500 may also include front handles 510 and back handles 514. As shown in FIG. 5C, front plate 502 may be coupled to lid 512 and bottom 518 via front panel mount 520. In one embodiment, battery pack 500 is implemented as a rack-mountable equipment module. For example, battery pack 500 may be implemented as a standard 19-inch rack (e.g., front panel 502 having a width of 19 inches, and battery pack 500 having a depth of between 22 and 24 inches and a height of 4 rack units or "U," where U is a standard unit that is equal to 1.752 inches). As shown in FIG. 5C, battery pack 500 may include one or more mounts 522 attached to bottom 518. Mount 522 may be used to secure battery pack 500 in a rack in order to arrange a plurality of battery packs in a stacked configuration.

In FIGS. 5A-D, battery pack 500 includes a power connector 504 that may be connected to the negative terminal of the battery pack and a power connector 506 that may be connected to a positive terminal of the battery pack. In other embodiments, the power connector 504 may be used to connect to a positive terminal of the battery pack, and power connector 506 may be used to connect to a negative terminal of the battery pack. As shown in FIGS. 5A and 5B, the power connectors 504 and 506 may be provided on the front plate or panel 502 of battery pack 500. Power cables (not shown) may be attached to the power connectors 504 and 506 and used to add or remove energy from battery pack 500.

The front panel 502 of battery pack 500 may also include a status light and reset button 508. In one embodiment, status button 508 is a push button that can be depressed to reset or restart battery pack 500. In one embodiment, the outer ring around the center of button 508 may be illuminated to indicate the operating status of battery pack 500. The illumination may be generated by a light source, such as one or more light emitting diodes, that is coupled to or part of the status button 508. In this embodiment, different color illumination may indicate different operating states of the battery pack. For example, constant or steady green light may indicate that battery pack 500 is in a normal operating state; flashing or strobing green light may indicate that battery pack 500 is in a normal operating state and that battery pack 500 is currently balancing the batteries; constant or steady yellow light may indicate a warning or that battery pack 500 is in an error state; flashing or strobing yellow light may indicate a warning or that battery pack 500 is in an error state and that battery pack 500 is currently balancing the batteries; constant or steady red light may indicate that the battery pack 500 is in an alarm state; flashing or strobing red light may indicate that battery pack 500 needs to be replaced; and no light emitted from the status light may indicate that battery pack 500 has no power and/or needs to be replaced. In some embodiments, when the status light emits red light (steady or flashing) or no light, connectors in battery pack 500 or in an external controller are automatically opened to prevent charging or discharging of the batteries. As would be apparent to one of ordinary skill in the art, any color, strobing technique, etc., of illumination to indicate the operating status of battery pack 500 is within the scope of this disclosure.

Turning to FIGS. 5C-D, example components that are disposed inside the housing of battery pack 500 are shown, including (but not limited to) balancing charger 532, battery pack controller (BPC) 534, and battery module controller (BMC) 538. Balancing charger 532 may be a power supply, such as a DC power supply, and may provide energy to all of the battery cells in a battery pack. In an embodiment, balancing charger 532 may provide energy to all of the battery cells in the battery pack at the same time. BMC 538 is coupled to battery module 536 and may selectively discharge energy from the battery cells that are included in battery module 536, as well as take measurements (e.g., voltage and temperature) of battery module 536. BPC 534 may control balancing charger 532 and BMC 538 to balance or adjust the voltage and/or state of charge of a battery module to a target voltage and/or state of charge value.

As shown, battery pack 500 includes a plurality of battery modules and a BMC (e.g., battery module controller 538) is coupled to each battery module (e.g., battery module 536). In one embodiment, which is described in more detail below, n BMCs (where n is greater than or equal to 2) can be daisy-chained together and coupled to a BPC to form a single-wire communication network. In this example arrangement, each BMC may have a unique address and the BPC may communicate with each of the BMCs by addressing one or more messages to the unique address of any desired BMC. The one or more messages (which include the unique address of the BMC) may include an instruction, for example, to remove energy from a battery module, to stop removing energy from a battery module, to measure and report the temperature of the battery module, and to measure and report the voltage of the battery module. In one embodiment, BPC 534 may obtain measurements (e.g., temperature, voltage) from each of the BMCs using a polling technique. BPC 534 may calculate or receive (e.g., from a controller outside of battery pack 500) a target voltage for battery pack 500, and may use the balancing charger 532 and the network of BMCs to adjust each of the battery modules to the target voltage. Thus, battery pack 500 may be considered a smart battery pack, able to self-adjust its battery cells to a target voltage.

The electrical wiring that connects various components of battery pack 500 has been omitted from FIG. 5C to enhance viewability. However, FIG. 5D illustrates example wiring in battery pack 500. In the illustrated embodiment, balancing charger 532 and battery pack controller 534 may be connected to or mounted on the bottom 518. While shown as mounted on the left side of battery pack 500, balancing charger 532 and battery pack controller 534, as well as all other components disposed in battery pack 500, may be disposed at any location within battery pack 500.

Battery module 536 includes a plurality of battery cells. Any number of battery cells may be included in battery module 536. Example battery cells include, but are not limited to, Li ion battery cells, such as 18650 or 26650 battery cells. The battery cells may be cylindrical battery cells, prismatic battery cells, or pouch battery cells, to name a few examples. The battery cells or battery modules may be, for example, up to 100 AH battery cells or battery modules. In some embodiments, the battery cells are connected in series/parallel configuration. Example battery cell configurations include, but are not limited to, 1P16S configuration, 2P16S configuration, 3P16S configuration, 4P16S configuration, 1P12S configuration, 2P12S configuration, 3P12S configuration, and 4P12S configuration. Other configurations known to one of ordinary skill in the art are within the scope of this disclosure. Battery module 536 includes positive and negative terminals for adding energy to and removing energy from the plurality of battery cells included therein.

As shown in FIG. 5C, battery pack 500 includes 12 battery modules that form a battery assembly. In another embodiment, battery pack 500 may include 16 battery modules that form a battery assembly. In other embodiments, battery pack 500 may include 20 battery modules or 25 battery modules that form a battery assembly. As would be apparent to one of ordinary skill in the art, any number of battery modules may be connected to form the battery assembly of battery pack 500. In battery pack 500, the battery modules that are arranged as a battery assembly may be arranged in a series configuration.

Figure 6:
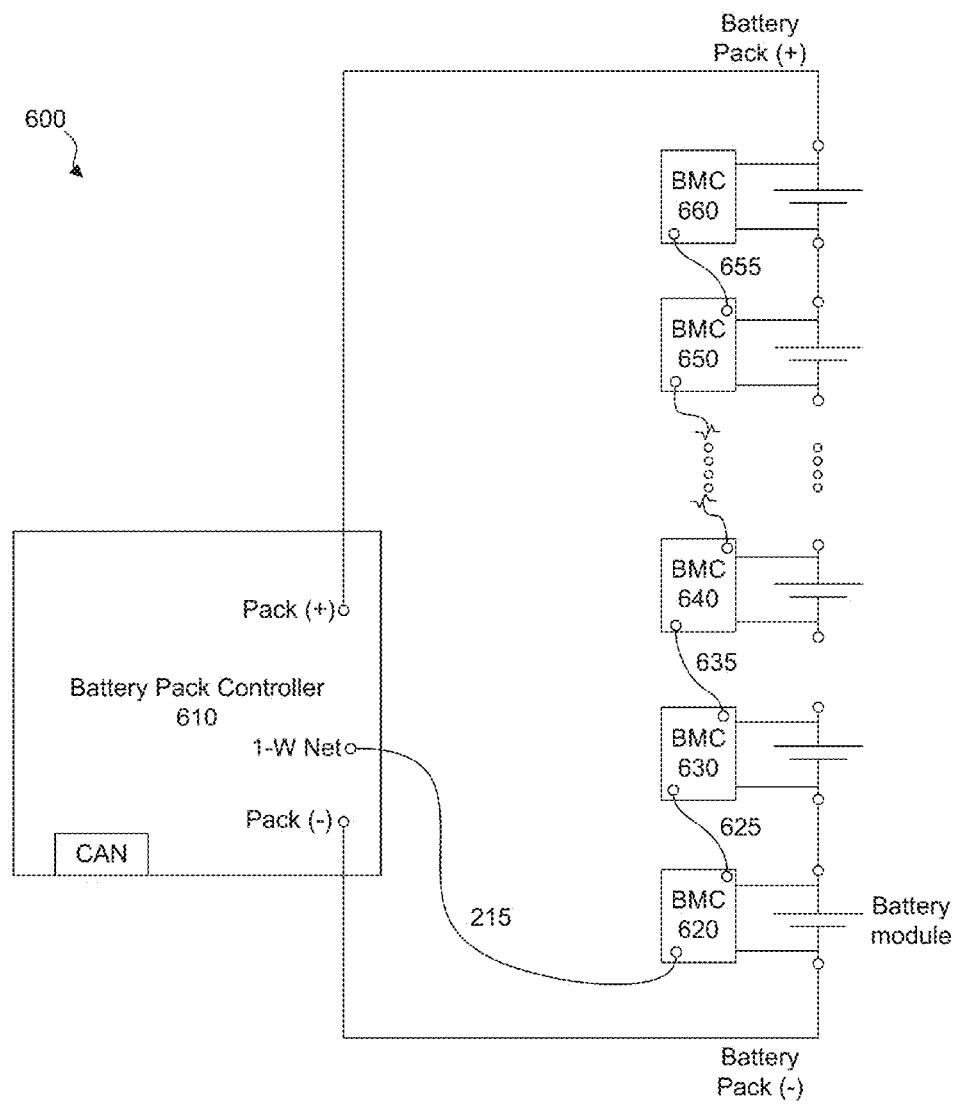
FIG. 6 is a diagram illustrating an example communication network formed by a battery pack controller and a plurality of battery module controllers.

In FIG. 5C, battery module controller 538 is coupled to battery module 536. Battery module controller 538 may be couple to the positive and negative terminals of battery module 536. Battery module controller 538 may be configured to perform one, some, or all of the following functions: remove energy from battery module 536, measure the voltage of battery module 536, and measure the temperature of battery module 536. As would be understood by one of ordinary skill in the art, battery module controller 538 is not limited to performing the functions just described. In one embodiment, battery module controller 538 is implemented as one or more circuits disposed on a printed circuit board. In battery pack 500, one battery module controller is coupled to or mounted on each of the battery modules in battery pack 500. Additionally, each battery module controller may be coupled to one or more adjacent battery module controllers via wiring to form a communication network. As illustrated in FIG. 6, n battery module controllers (where n is a whole number greater than or equal to two) may be daisy-chained together and coupled to a battery pack controller to form a communication network.

FIG. 6 is a diagram illustrating an example communication network 600 formed by a battery pack controller and a plurality of battery module controllers according to an embodiment of the disclosure. In FIG. 6A, battery pack controller (BPC) 610 is coupled to n battery module controllers (BMCs) 620, 630, 640, 650, and 660. Said another way, n battery module controllers (where n is a whole number greater than or equal to two) are daisy-chained together and coupled to battery pack controller 610 to form communication network 600, which may be referred to as a distributed, daisy-chained battery management system (BMS). Specifically, BPC 610 is coupled to BMC 620 via communication wire 615, BMC 620 is coupled to BMC 630 via communication wire 625, BMC 630 is coupled to BMC 640 via communication wire 635, and BMC 650 is coupled to BMC 660 via communication wire 655 to form the communication network. Each communication wire 615, 625, 635, and 655 may be a single wire, forming a single-wire communication network that allows the BPC 610 to communicate with each of the BMCs 620-660, and vice versa. As would be apparent to one of skill in the art, any number of BMCs may be daisy chained together in communication network 600.

Each BMC in the communication network 600 may have a unique address that BPC 610 uses to communicate with individual BMCs. For example, BMC 620 may have an address of 0002, BMC 630 may have an address of 0003, BMC 640 may have an address of 0004, BMC 650 may have an address of 0005, and BMC 660 may have an address of 0006. BPC 610 may communicate with each of the BMCs by addressing one or more messages to the unique address of any desired BMC. The one or more messages (which include the unique address of the BMC) may include an instruction, for example, to remove energy from a battery module, to stop removing energy from a battery module, to measure and report the temperature of the battery module, and to measure and report the voltage of the battery module. BPC 610 may poll the BMCs to obtain measurements related to the battery modules of the battery pack, such as voltage and temperature measurements. Any polling technique known to one of skill in the art may be used. In some embodiments, BPC 610 continuously polls the BMCs for measurements in order to continuously monitor the voltage and temperature of the battery modules in the battery pack.

For example, BPC 610 may seek to communicate with BMC 640, e.g., in order to obtain temperature and voltage measurements of the battery module that BMC 640 is mounted on. In this example, BPC 610 generates and sends a message (or instruction) addressed to BMC 640 (e.g., address 0004). The other BMCs in the communication network 600 may decode the address of the message sent by BPC 610, but only the BMC (in this example, BMC 640) having the unique address of the message may respond. In this example, BMC 640 receives the message from BPC 610 (e.g., the message traverses communication wires 615, 625, and 635 to reach BMC 640), and generates and sends a response to BPC 610 via the single-wire communication network (e.g., the response traverses communication wires 635, 625, and 615 to reach BPC 610). BPC 610 may receive the response and instruct BMC 640 to perform a function (e.g., remove energy from the battery module it is mounted on). In other embodiments, other types of communication networks (other than communication network 600) may be used, such as, for example, an RS232 or RS485 communication network.

Figure 7:
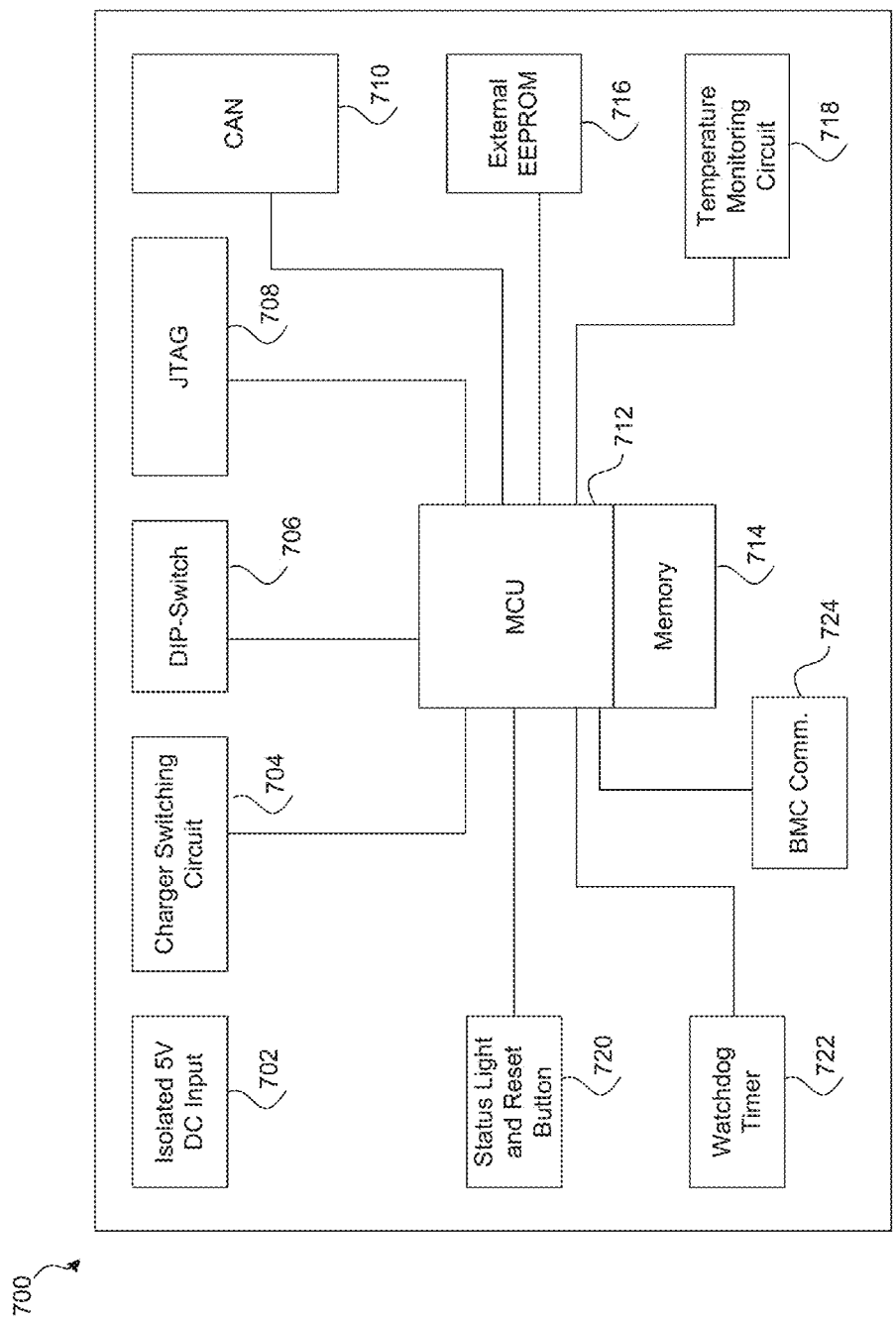
FIG. 7 is a diagram illustrating an example battery pack controller.

FIG. 7 is a diagram illustrating an example battery pack controller 700 according to an embodiment of the disclosure. Battery pack controller 534 of FIGS. 5C and 5D may be implemented as described in accordance with battery pack controller 700 of FIG. 7. Battery pack controller 610 of FIG. 6 may be implemented as described in accordance with battery pack controller 700 of FIG. 7.

As shown in FIG. 7, the example battery pack controller 700 includes a DC input 702 (which may be an isolated 5V DC input), a charger switching circuit 704, a DIP-switch 706, a JTAG connection 708, a CAN (CANBus) connection 710, a microprocessor unit (MCU) 712, memory 714, an external EEPROM 716, a temperature monitoring circuit 718, a status light and reset button 720, a watchdog timer 722, and a battery module controller (BMC) communication connection 724.

In one embodiment, battery pack controller 700 may be powered from energy stored in the battery cells. Battery pack controller 700 may be connected to the battery cells by DC input 702. In other embodiments, battery pack controller 700 may be powered from an AC to DC power supply connected to DC input 702. In these embodiments, a DC-DC power supply may then convert the input DC power to one or more power levels appropriate for operating the various electrical components of battery pack controller 700.

In the example embodiment illustrated in FIG. 7, charger switching circuit 704 is coupled to MCU 712. Charger switching circuit 704 and MCU 712 may be used to control operation of a balancing charger, such as balancing charger 532 of FIG. 5C. As described above, a balancing charger may add energy to the battery cells of the battery pack. In an embodiment, temperature monitoring circuit 718 includes one or more temperature sensors that can monitor the temperature heat sources within the battery pack, such as the temperature of the balancing charger that is used to add energy to the battery cells of the battery pack.

Battery pack controller 700 may also include several interfaces and/or connectors for communicating. These interfaces and/or connectors may be coupled to MCU 712 as shown in FIG. 7. In one embodiment, these interfaces and/or connectors include: DIP-switch 706, which may be used to set a portion of software bits used to identify battery pack controller 700; JTAG connection 708, which may be used for testing and debugging battery pack controller 700; CAN (CANBus) connection 710, which may be used to communicate with a controller that is outside of the battery pack; and BMC communication connection 724, which may be used to communicate with one or more battery module controllers, such as a distributed, daisy-chained network of battery module controllers (e.g., FIG. 6). For example, battery pack controller 700 may be coupled to a communication wire, e.g., communication wire 615 of FIG. 6, via BMC communication connection 724.

Battery pack controller 700 also includes an external EEPROM 716. External EEPROM 716 may store values, measurements, etc., for the battery pack. These values, measurements, etc., may persist when power of the battery pack is turned off (i.e., will not be lost due to loss of power). External EEPROM 716 may also store executable code or instructions, such as executable code or instructions to operate microprocessor unit 712.

Microprocessor unit (MCU) 712 is coupled to memory 714. MCU 712 is used to execute an application program that manages the battery pack. As described herein, in an embodiment the application program may perform the following functions (but is not limited thereto): monitor the voltage and temperature of the battery cells of battery pack 600, balance the battery cells of battery pack 500, monitor and control (if needed) the temperature of battery pack 500, handle communications between the battery pack and other components of a battery energy storage system, and generate warnings and/or alarms, as well as take other appropriate actions, to protect the battery cells of battery pack 500.

As described above, a battery pack controller may obtain temperature and voltage measurements from battery module controllers. The temperature readings may be used to ensure that the battery cells are operated within their specified temperature limits and to adjust temperature related values calculated and/or used by the application program executing on MCU 712. Similarly, the voltage readings are used, for example, to ensure that the battery cells are operated within their specified voltage limits.

Watchdog timer 722 is used to monitor and ensure the proper operation of battery pack controller 700. In the event that an unrecoverable error or unintended infinite software loop should occur during operation of battery pack controller 700, watchdog timer 722 can reset battery pack controller 700 so that it resumes operating normally. Status light and reset button 720 may be used to manually reset operation of battery pack controller 700. As shown in FIG. 7, status light and reset button 720 and watchdog timer 722 may be coupled to MCU 712.

Figure 8:
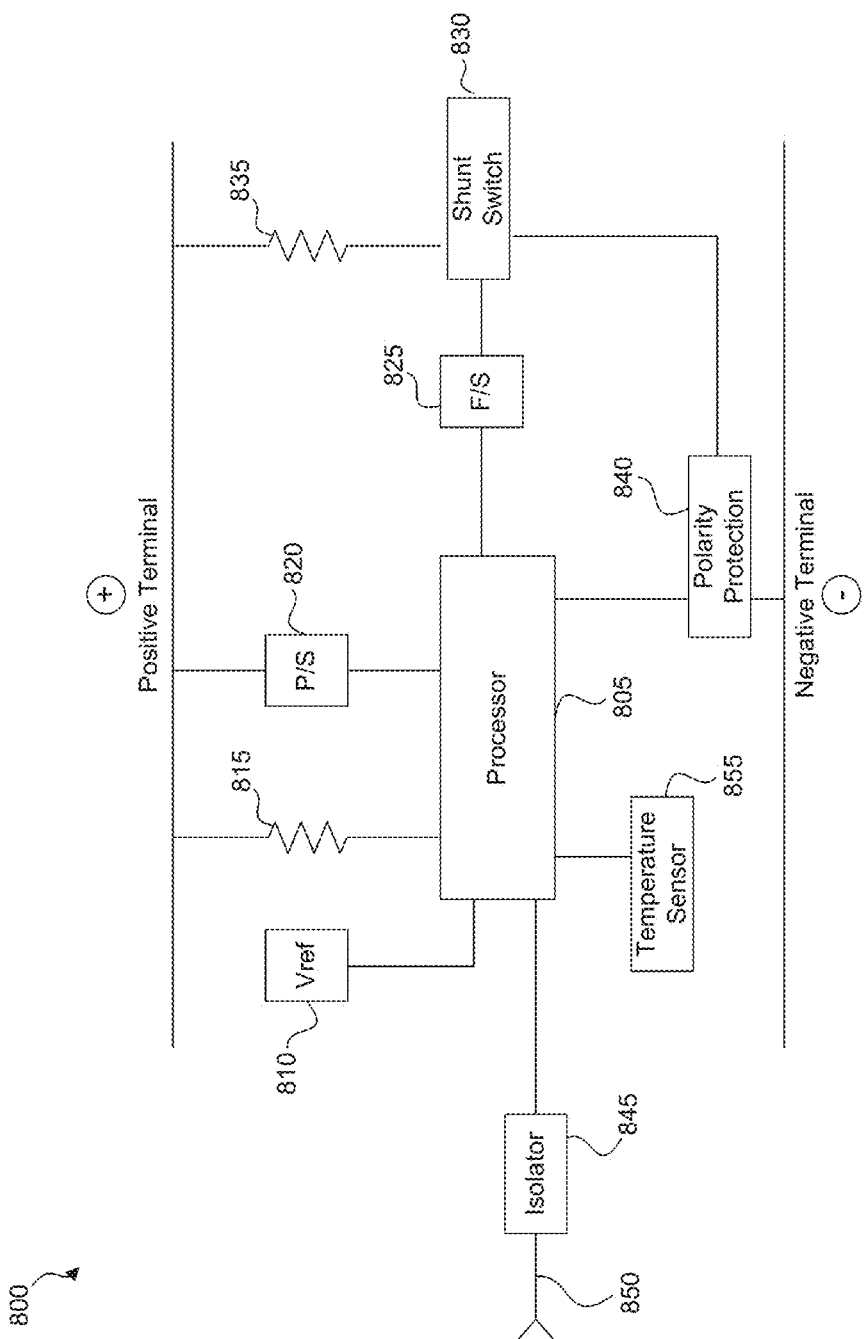
FIG. 8 is a diagram illustrating an example battery module controller.

FIG. 8 is a diagram illustrating an example battery module controller 800 according to an embodiment of the disclosure. Battery module controller 538 of FIGS. 5C and 5D may be implemented as described in accordance with battery module controller 800 of FIG. 8. Each of battery module controllers 620, 630, 640, 650, and 660 of FIG. 6 may be implemented as described in accordance with battery module controller 800 of FIG. 8. Battery module controller 800 may be mounted on a battery module of a battery pack and may perform the following functions (but is not limited thereto): measure the voltage of the battery module, measure the temperature of the battery module, and remove energy from (discharge) the battery module.

In FIG. 8, the battery module controller 800 includes processor 805, voltage reference 810, one or more voltage test resistors 815, power supply 820, fail safe circuit 825, shunt switch 830, one or more shunt resistors 835, polarity protection circuit 840, isolation circuit 845, and communication wire 850. Processor 805 controls the battery module controller 800. Processor 805 receives power from the battery module that battery module controller 800 is mounted on via the power supply 820. Power supply 820 may be a DC power supply. As shown in FIG. 8, power supply 820 is coupled to the positive terminal of the battery module, and provides power to processor 805. Processor 805 is also coupled to the negative terminal of the battery module via polarity protection circuit 840, which protects battery module controller 800 in the event that it is improperly mounted on a battery module (e.g., the components of battery module controller 800 that are coupled to the positive terminal in FIG. 8 are improperly coupled to the negative terminal and vice versa).

Battery module controller 800 may communicate with other components of a battery pack (e.g., a battery pack controller, such as battery pack controller 534 of FIG. 5C) via communication wire 850, which may be a single wire. As described with respect to the example communication network of FIG. 6, communication wire 850 may be used to daisy chain battery module controller 800 to a battery pack controller and/or one or more other battery module controllers to form a communication network. Communication wire 850 may be coupled to battery pack controller 800 via a communication terminal disposed on battery pack controller 800. As such, battery module controller 800 may send and receive messages (including instructions sent from a battery pack controller) via communication wire 850. When functioning as part of a communication network, battery module controller 800 may be assigned a unique network address, which may be stored in a memory device of the processor 805.

Battery module controller 800 may be electrically isolated from other components that are coupled to the communication wire (e.g., battery pack controller, other battery module controllers, computing systems external to the battery pack) via isolation circuit 845. In the embodiment illustrated in FIG. 8, isolation circuit 845 is disposed between communication wire 850 and processor 805. Again, communication wire 850 may be coupled to battery pack controller 800 via a communication terminal disposed on battery pack controller 800. This communication terminal may be disposed between communication wire 850 and isolation circuit 845, or may be part of isolation circuit 845. Isolation circuit 845 may capacitively couple processor 805 to communication wire 850, or may provide other forms of electrical isolation known to those of skill in the art.

As explained above, battery module controller 800 may measure the voltage of the battery module it is mounted on. As shown in FIG. 8, processor 805 is coupled to voltage test resistor 815, which is coupled to the positive terminal of the battery module. Processor 805 may measure the voltage across voltage test resistor 815, and compare this measured voltage to voltage reference 810 to determine the voltage of the battery module. As described with respect to FIG. 6, battery module controller 800 may be instructed to measure the voltage of the battery module by a battery pack controller. After performing the voltage measurement, processor 805 may report the voltage measurement to a battery pack controller via communication wire 850.

Battery module controller 800 may also remove energy from the battery module that it is mounted on. As shown in FIG. 8, processor 805 is coupled to fail safe circuit 825, which is coupled to shunt switch 830. Shunt switch 830 is also coupled to the negative terminal via polarity protection circuit 840. Shunt resistor 835 is disposed between the positive terminal of the battery module and shunt switch 830. In this embodiment, when shunt switch 830 is open, shunt resistor 835 is not applied across the positive and negative terminals of the battery module; and when shunt switch 830 is closed, shunt resistor 835 is applied across the positive and negative terminals of the battery module in order to remove energy from the battery module. Processor 805 may instruct shunt switch 830 to selectively apply shunt resistor 835 across the positive and negative terminals of the battery module in order to remove energy from the battery module. In one embodiment, processor 805 instructs shunt switch 830 at regular intervals (e.g., once every 30 seconds) to apply shunt resistor 835 in order to continuously discharge the battery module.

Fail safe circuit 825 may prevent shunt switch 830 from removing too much energy from the battery module. In the event that processor 805 malfunctions, fail safe circuit 825 may instruct shunt switch 830 to stop applying shunt resistor 835 across the positive and negative terminals of the battery module. For example, processor 805 may instruct shunt switch 830 at regular intervals (e.g., once every 30 seconds) to apply shunt resistor 835 in order to continuously discharge the battery module. Fail safe circuit 825, which is disposed between processor 805 and shunt switch 830, may monitor the instructions processor 805 sends to shunt switch 830. In the event that processor 805 fails to send a scheduled instruction to the shunt switch 830 (which may be caused by a malfunction of processor 805), fails safe circuit 825 may instruct or cause shunt switch 830 to open, preventing further discharge of the battery module. Processor 805 may instruct fail safe circuit 825 to prevent shunt switch 830 from discharging the battery module below a threshold voltage or state-of-charge level, which may be stored or calculated in battery module controller 800 or in an external controller (e.g., a battery pack controller).

Battery module controller 800 of FIG. 8 also includes temperature sensor 855, which may measure the temperature of the battery module that battery module controller 800 is connected to. As depicted in FIG. 8, temperature sensor 855 is coupled to processor 805, and may provide temperature measurements to processor 805. Any temperature sensor known to those skilled in the art may be used to implement temperature sensor 855.

Figure 9A:
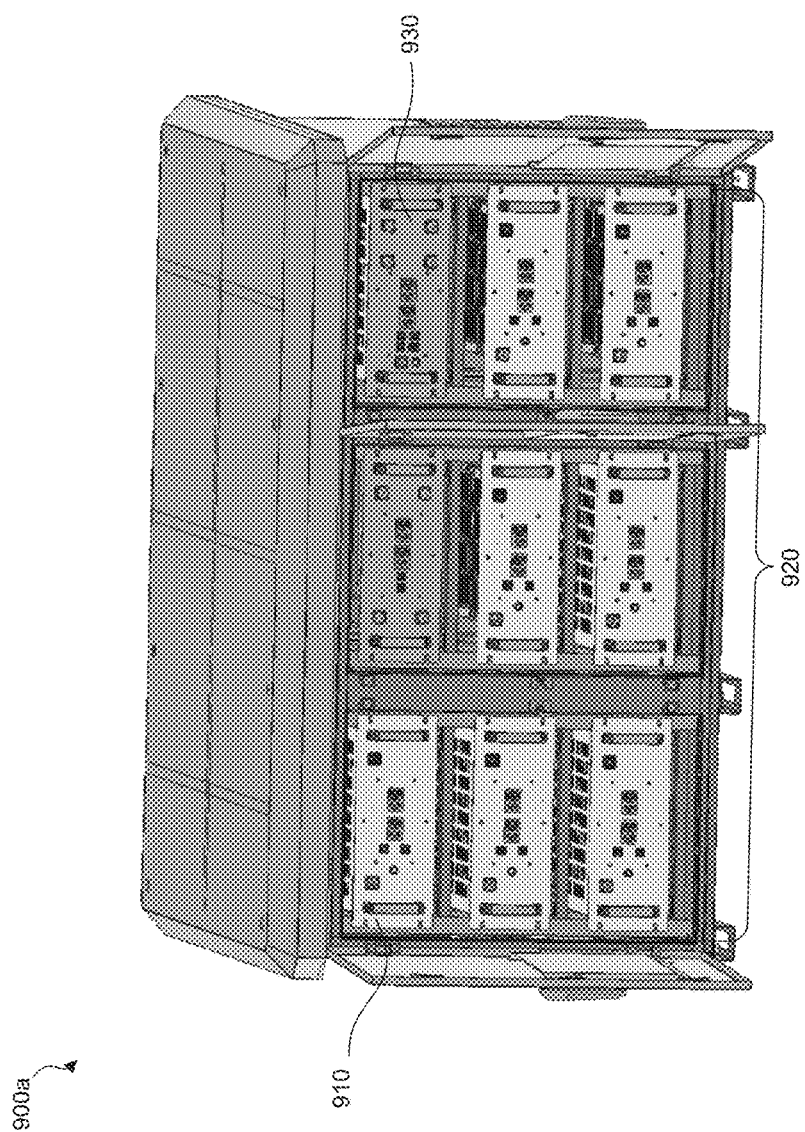
FIGS. 9A-9C are diagrams illustrating example embodiments of a battery energy storage system.
Figure 9B:
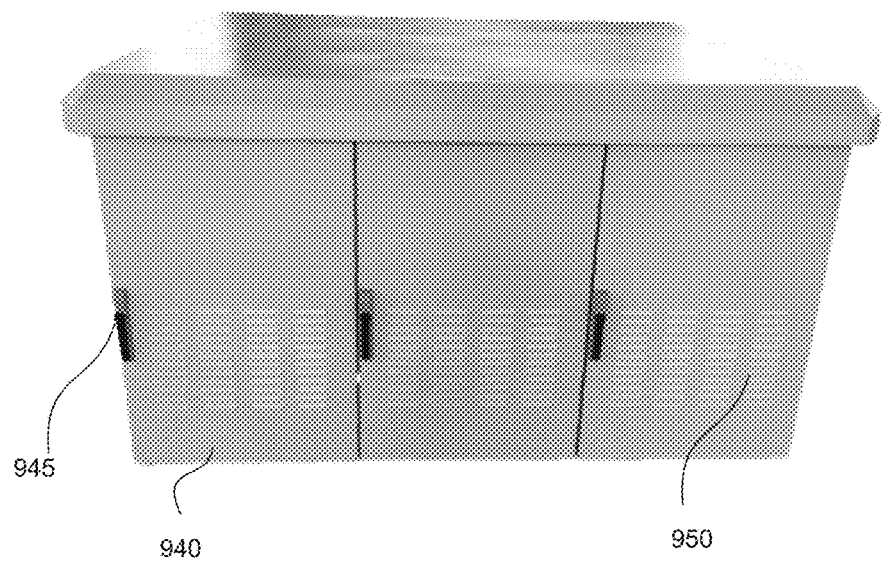
Figure 9C:
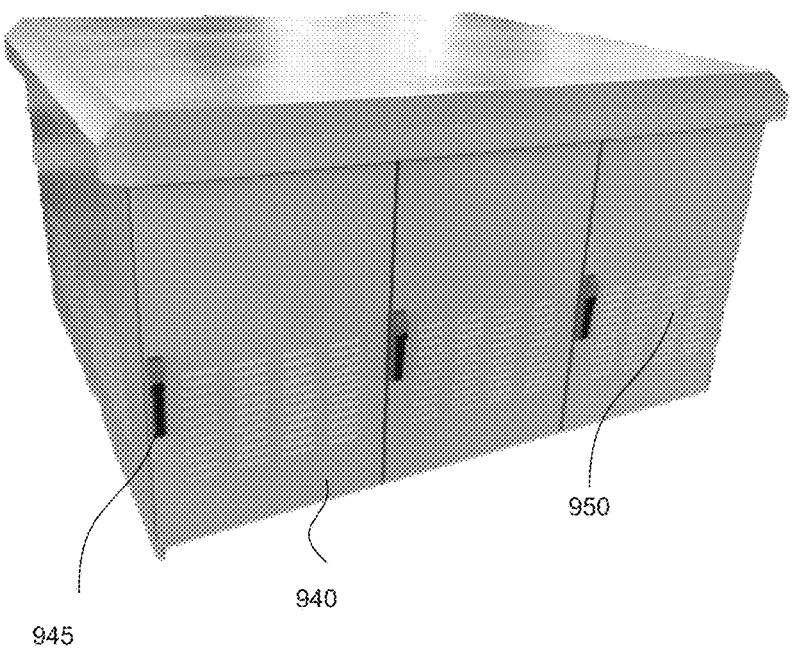

FIG. 9A is a diagram that illustrates an example battery energy storage system 900a. BESS 900a is housed in a container as shown in FIGS. 9B-9C. Other housings known to those skilled in the art are within the scope of this disclosure. As shown in FIG. 9A, battery energy storage system 900a includes a plurality of battery packs, such as battery pack 910. Battery pack 910 may be implemented as described with respect to FIGS. 5-8 above. As explained above, each battery pack includes battery cells (which may be arranged into battery modules), a battery pack controller that monitors the battery cells, a balancing charger (e.g., DC power supply) that adds energy to each of the battery cells, and a distributed, daisy-chained network of battery module controllers that may take certain measurements of and remove energy from the battery cells. As explained, the battery pack controller may control the network of battery module controllers and the balancing charger to control the state-of-charge or voltage of a battery pack.

The battery packs of battery energy storage system 900a may be mounted on racks. A plurality of battery packs may be connected in series, which may be referred to as a string of battery packs or a battery pack string. For example, battery pack 910 may be connected in series with other battery packs to form battery pack string 920.

Each battery pack string may be controlled by a controller, which may be referred to as a string controller. For example, battery pack string 920 may be controlled by string controller 930. As its name suggests, a string controller may monitor and control the battery packs of a string. String controller 930 communicates with a battery pack controller (BPC) in each of the battery packs in its string to monitor and control charging and discharging of the battery packs. In one embodiment, a string controller sends each battery pack in its string a target voltage, and the battery packs adjust the battery cells to the target voltage. A string controller and BPC may also communicate measurements (e.g., voltage, temperature, current values), and perform diagnostic procedures, startup procedures, and the like.

FIGS. 9B-9C illustrate the housing of an example BESS. The housing of the BESS includes one or more doors 940, each of which includes a door handle 945. The internal components of the BESS (e.g., battery packs, string controller, etc.) may be accessed via doors 940. The container may include air vents, such as air vent 950, to allow heat dissipation.

Figure 10A:
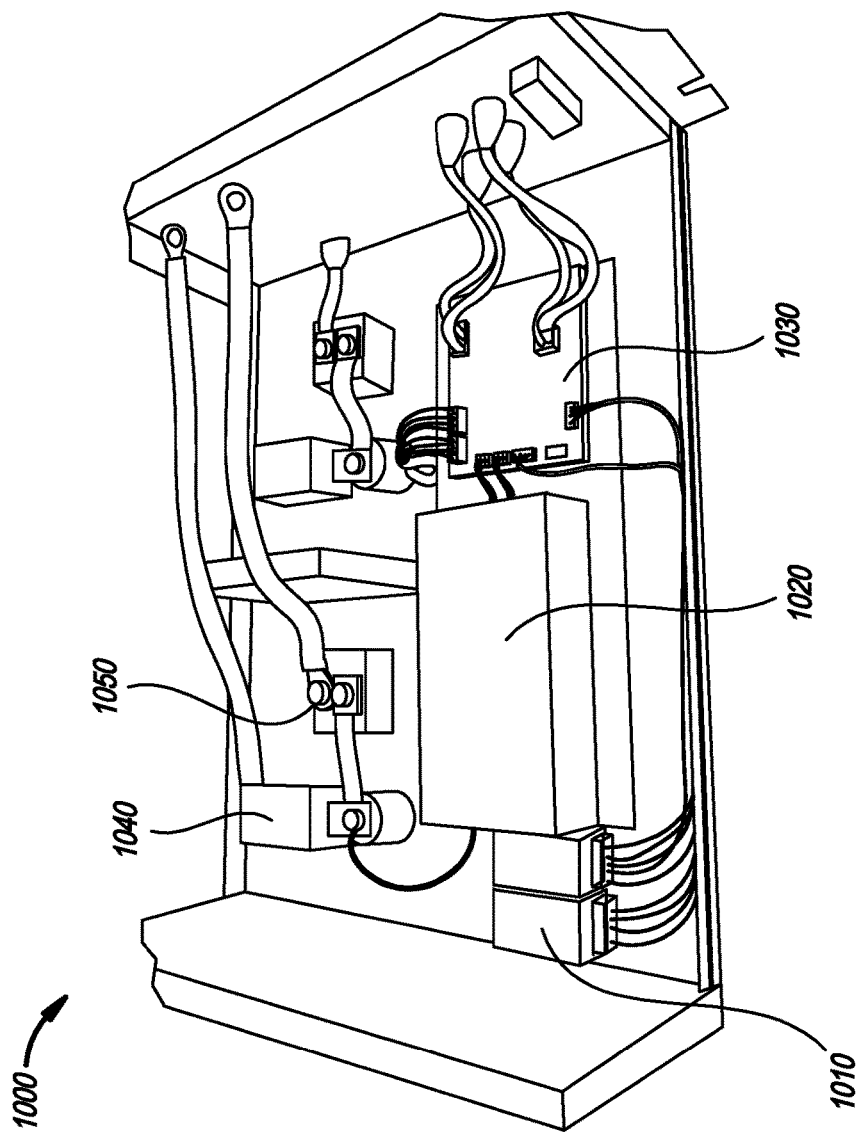
FIGS. 10A-10B are diagrams illustrating an example string controller.
Figure 10B:
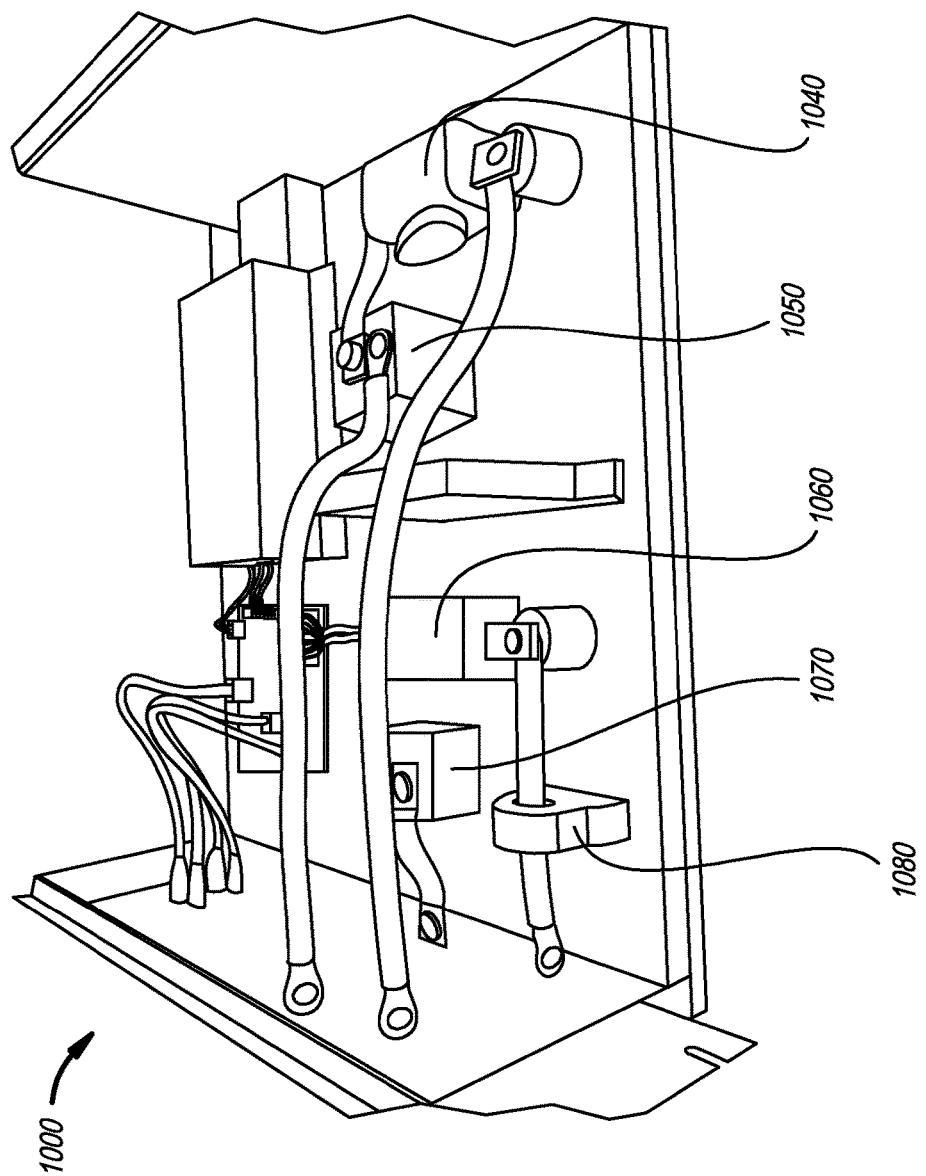

FIGS. 10A-10B are diagrams illustrating an example string controller 1000. As shown in FIG. 10A, string controller 1000 includes battery voltage and ground fault detection unit 1010, power supply 1020, string control board 1030, positive fuse 1040, and positive contactor 1050. FIG. 10B illustrates another angle of string controller 1000 and depicts negative fuse 1060, negative contactor 1070, and current sensor 1080. These components are described in more detail with respect to FIG. 11.

Figure 11:
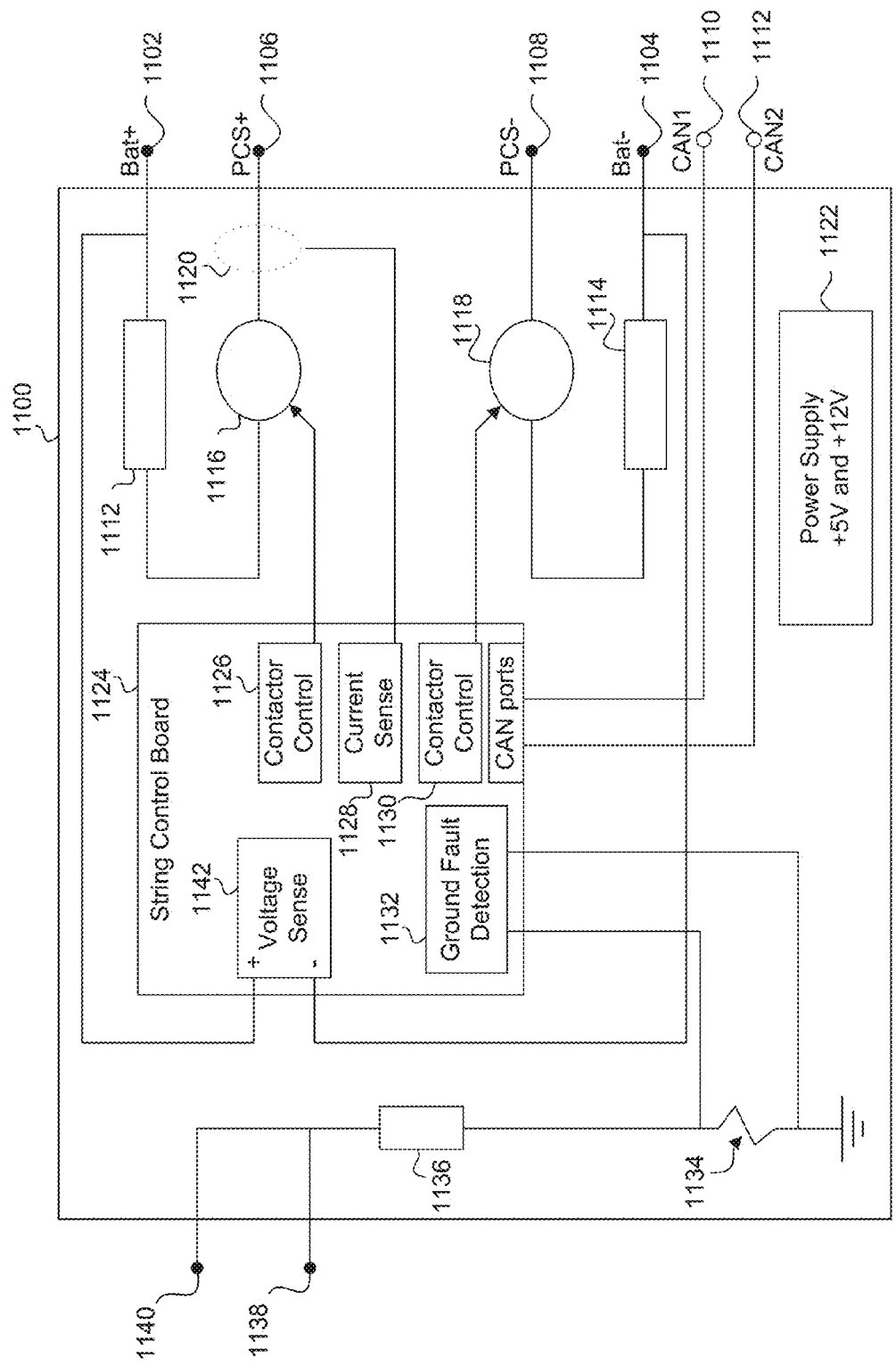
FIG. 11 is a diagram illustrating an example string controller.

FIG. 11 is a diagram illustrating an example string controller 1100. Specifically, FIG. 11 illustrates example components of a string controller 1100. The example components depicted in FIG. 11 may be used to implement the disclosed string controller 930 of FIG. 9. String controller 1100 includes a string control board 1124 that controls the overall operation of string controller 1100. String control board may be implement as one or more circuits or integrated circuits mounted on a printed circuit board (for example, string control board 1030 of FIG. 10A). String control board 1124 may include or be implemented as a processing unit, such as a microprocessor unit (MCU), memory, and executable code. Units 1126, 1128, 1130, 1132, and 1142 illustrated in string control board 1124 may be implemented in hardware, software, or a combination of hardware and software. Units 1126, 1128, 1130, 1132, and 1142 may be individual circuits mounted on a print circuit board or a single integrated circuit.

The functions performed by string controller 1100 may include, but are not limited to, the following: issuing battery string contactor control commands, measuring battery string voltage; measuring battery string current; calculating battery string Amp-hour count; relaying queries between a system controller (e.g., at charging station) and battery pack controllers; processing query response messages; aggregating battery string data; performing software device ID assignment to the battery packs; detecting ground fault current in the battery string; and detect alarm and warning conditions and taking appropriate corrective actions.

String controller 1100 includes battery string terminals 1102 and 1104 for coupling to the positive and negative terminals, respectively, of a battery string (also referred to as a string of battery packs). Battery string terminals 1102 and 1104 are coupled to voltage sense unit 1142 on string control board 1124 that can be used to measure battery string voltage.

String controller 1100 also includes PCS terminals 1106 and 1108 for coupling to the positive and negative terminals, respectively of a power control system (PCS). As shown, positive battery string terminal 1102 is coupled to positive PCS terminal 1106 via contactor 1116, and negative battery string terminal 1104 is coupled to negative PCS terminal 1108 via contactor 1118. String control board 1124 controls contactors 1116 and 1118 (to open and close) via contactor control unit 1126 and 1130, respectively, allowing battery string to provide energy to PCS (discharging) or receive energy from PCS (charging) when contractors 1116 and 1118 are closed. Fuses 1112 and 1114 protect the battery string from excessive current flow.

String controller 1100 also includes communication terminals 1110 and 1112 for coupling to other devices. In an embodiment, communication terminal 1110 may couple string controller 1100 to the battery pack controllers of the battery string, allowing string controller 1100 to issue queries, instructions, and the like. For example, string controller 1100 may issue an instruction causing the battery string to charge or discharge. In an embodiment, communication terminal 1112 may couple string controller 1100 to a system controller, such as a system controller in a charging station. Communication terminals 1110 and 1112 may allow string controller 1100 to relay queries between a system controller (e.g., at charging station) and battery pack controllers, aggregate battery string data, perform software device ID assignment to the battery packs, detect alarm and warning conditions and taking appropriate corrective actions, as well as other functions.

String controller 1100 includes power supply unit 1122. Power supply 1020 of FIG. 10A may be implemented as described with respect to power supply unit 1122 of FIG. 11. In this embodiment, power supply unit 1122 can provide more than one DC supply voltage. For example, power supply unit 1122 can provide one supply voltage to power string control board 1124, and another supply voltage to operate contactors 1116 and 1118. In an embodiment, a +5V DC supply may be used for string control board 1122, and +12V DC may be used to close contactors 1116 and 1118.

String control board 1124 includes current sense unit 1128 which controls current sensor 1120, which may allow string controller to measure battery string current, calculate battery string Amp-hour count, as well as other functions. Additionally, current sense unit 1128 may provide overcurrent protection. For example, if over-current (a current level higher than a pre-determined threshold) is sensed in current sensor 1120, current sensor unit 1128 may instruct contactor control units 1126 and 1130 to open contactors 1116 and 1118, respectively, disconnecting battery string from PCS. Again, fuses 1112 and 1114 may also provide overcurrent protection, disconnecting battery sting from PCS when a threshold current is exceeded.

String controller 1100 includes battery voltage and ground fault detection (for example, battery voltage and ground fault detection 1010 of FIG. 10A). Terminals 1138 and 1140 may couple string controller 1100 to battery packs in the middle of battery pack string. For example, in a string of 22 battery packs, terminal 1138 may be connected to the negative terminal of battery pack 11 and terminal 1140 may be connected to the positive terminal of battery pack 12. Ground fault detection unit 1132 measures the voltage at the middle of the battery string using a resistor 1134 and provides ground fault detection. Additionally, fuse 1136 is coupled to terminals 1138 and 1140 to provide additional overcurrent protection at the middle of the battery string.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. Also, Identifiers, such as "(a)," "(b)," "(i)," "(ii)," etc., are sometimes used for different elements or steps. These identifiers are used for clarity and do not necessarily designate an order for the elements or steps.

The foregoing description of specific embodiments will so fully reveal the general nature of the embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described embodiments, but should be defined only in accordance with the following claims and their equivalents.

What is claimed is:

1. A battery-assisted electric vehicle charging system, the system comprising:
   a battery system;
   a charging station coupled to the battery system and to an electric power grid, and configured to provide a predetermined amount of power to an electric vehicle;
   a first power providing unit coupled to the battery system, the first power providing unit including a first plurality of power providing modules configured to provide a first portion of the predetermined amount of power from the battery system to the electric vehicle, wherein each of the first plurality of power providing modules provides an equal amount of power; and
   a second power providing unit coupled to the electric power grid, the second power providing unit including a second plurality of power providing modules configured to provide the second portion of the predetermined amount of power from the electric power grid to the electric vehicle, wherein each of the second plurality of power providing modules provides an equal amount of power, and
   wherein at least one of the first plurality of power providing modules is disabled to reduce the first portion of the predetermined amount of power provided to the electric vehicle in response to the electric vehicle exceeding a predefined charge threshold.

2. The system of claim 1, wherein the predetermined amount of power is 50 kilowatts (KW).

3. The system of claim 2, wherein the first portion of the predetermined amount of power is 30 KW and the second portion of the predetermined amount of power is 20 KW.

4. The system of claim 2, wherein the first portion of the predetermined amount of power is 20 KW and the second portion of the predetermined amount of power is 30 KW.

5. The system of claim 1, wherein the second power providing unit comprises an alternating current (AC) to direct current (DC) converter configured to convert AC power from the electric power grid to DC power.

6. The system of claim 1, wherein the battery system comprises:
   a plurality of battery packs configured to provide energy to the charging station; and
   a controller configured to determine a state of charge of the plurality of battery packs and to prevent the battery packs from providing energy to the charging station in response to determining that the state of charge is below a discharge threshold.

7. The system of claim 6, wherein the charging station is further configured to provide a default amount of power to the electric vehicle in response to the controller determining that the state of charge is below the threshold, wherein the default amount of power is less than the predetermined amount of power.

8. The system of claim 1, wherein the battery system is coupled to the electric power grid and is further configured to receive energy from the electric power grid.

9. The system of claim 1, wherein the charging station comprises a system controller configured to receive a request for charge from the electric vehicle and to instruct the battery system to provide energy to the charging station in response to the request for charge.

10. A method for charging an electric vehicle using a battery-assisted electric vehicle charging system, the method comprising:
   receiving, at a charging station, a request from an electric vehicle for a predetermined amount of power, wherein the charging station comprises a first power providing unit including a first plurality of power providing modules and a second power providing unit including a second plurality of power providing modules;
   providing, by the first plurality of power providing modules of the first power providing unit, a first portion of the predetermined amount of power from a battery system coupled to the charging station in response to the request, wherein each of the first plurality of power providing modules provides an equal amount of power;
   providing, by the second plurality of power providing modules of the second power providing unit, a second portion of the predetermined amount of power from an electric power grid coupled to the charging station in response to the request, wherein each of the second plurality of power providing modules provides an equal amount of power; and
   disabling at least one of the first plurality of power providing modules of the first power providing unit to reduce the first portion of the predetermined amount of power provided to the electric vehicle in response to the electric vehicle exceeding a predefined charge threshold.

11. The method of claim 9, wherein the predetermined amount of power is 50 kilowatts (KW).

12. The method of claim 11, wherein the first portion of the predetermined amount of power is 30 KW and the second portion of the predetermined amount of power is 20 KW.

13. The method of claim 11, wherein the first portion of the predetermined amount of power is 20 KW and the second portion of the predetermined amount of power is 30 KW.

14. The method of claim 9, further comprising:
   discontinuing providing the first portion of power from the battery system in response to a state of charge of the battery system being below a discharge threshold or the electric vehicle being charged.

15. The method of claim 14, further comprising:
   discontinuing providing the second portion of power from the electric power grid in response to the electric vehicle being charged.

16. The method of claim 9, wherein providing the first portion of the predetermined amount of power from the battery system comprises:
   determining, by a controller disposed in the battery system, a state of charge of a plurality of battery packs disposed in the battery system; and
   discharging energy from the plurality of battery packs to provide the first portion of the predetermined amount of power to the charging station until the state of charge is less than a discharge threshold or the electric vehicle is charged.

17. The method of claim 16, wherein providing the first portion of the predetermined amount of power from the battery system comprises:
   preventing the plurality of battery packs from providing energy to the charging station in response to determining that the state of charge is below the discharge threshold.

18. The method of claim 17, further comprising:
   adding energy to the plurality of battery packs from an electric power grid until the state of charge exceeds a charge threshold.

* * * * *